Feb. 7, 1961 J. M. CUNNINGHAM 2,970,878

ELAPSED TIME COMPUTER

Filed Dec. 17, 1953 27 Sheets-Sheet 1

INVENTOR.
JAMES M. CUNNINGHAM

BY G. R. Gugger

AGENT

Feb. 7, 1961 J. M. CUNNINGHAM 2,970,878

ELAPSED TIME COMPUTER

Filed Dec. 17, 1953 27 Sheets-Sheet 2

INVENTOR.
JAMES M. CUNNINGHAM

BY G. R. Gugger
AGENT

Feb. 7, 1961 J. M. CUNNINGHAM 2,970,878

ELAPSED TIME COMPUTER

Filed Dec. 17, 1953 27 Sheets-Sheet 3

INVENTOR.
JAMES M. CUNNINGHAM

BY G. R. Gugger
AGENT

Feb. 7, 1961 J. M. CUNNINGHAM 2,970,878

ELAPSED TIME COMPUTER

Filed Dec. 17, 1953 27 Sheets-Sheet 4

INVENTOR.
JAMES M. CUNNINGHAM

BY

G.R. Gugger
AGENT

Feb. 7, 1961 J. M. CUNNINGHAM 2,970,878

ELAPSED TIME COMPUTER

Filed Dec. 17, 1953 27 Sheets-Sheet 5

INVENTOR.
JAMES M. CUNNINGHAM

BY G. C. Gugger
AGENT

INVENTOR.
JAMES M. CUNNINGHAM
BY
G. R. Gugger
AGENT

INVENTOR.
JAMES M. CUNNINGHAM
BY
G. R. Gugger
AGENT

Feb. 7, 1961 J. M. CUNNINGHAM 2,970,878

ELAPSED TIME COMPUTER

Filed Dec. 17, 1953 27 Sheets-Sheet 8

INVENTOR.
JAMES M. CUNNINGHAM

BY

G. R. Gugger
AGENT

Feb. 7, 1961 J. M. CUNNINGHAM 2,970,878

ELAPSED TIME COMPUTER

Filed Dec. 17, 1953 27 Sheets-Sheet 9

INVENTOR.
JAMES M. CUNNINGHAM

BY

G. R. Gugger

AGENT

Feb. 7, 1961 J. M. CUNNINGHAM 2,970,878

ELAPSED TIME COMPUTER

Filed Dec. 17, 1953 27 Sheets-Sheet 10

*INVENTOR.*
JAMES M. CUNNINGHAM

*BY*

G. R. Gugger
AGENT

Feb. 7, 1961 J. M. CUNNINGHAM 2,970,878

ELAPSED TIME COMPUTER

Filed Dec. 17, 1953 27 Sheets-Sheet 11

INVENTOR.
JAMES M. CUNNINGHAM

BY G. R. Gugger
AGENT

Feb. 7, 1961

J. M. CUNNINGHAM 2,970,878

ELAPSED TIME COMPUTER

Filed Dec. 17, 1953

27 Sheets-Sheet 12

INVENTOR.
JAMES M. CUNNINGHAM

BY

G. R. Gugger
AGENT

Feb. 7, 1961 J. M. CUNNINGHAM 2,970,878

ELAPSED TIME COMPUTER

Filed Dec. 17, 1953 27 Sheets-Sheet 13

INVENTOR.
JAMES M. CUNNINGHAM

BY

G. R. Gugger
AGENT

*INVENTOR.*
JAMES M. CUNNINGHAM
*BY*
G. R. Gugger
AGENT

Feb. 7, 1961

J. M. CUNNINGHAM 2,970,878

ELAPSED TIME COMPUTER

Filed Dec. 17, 1953

27 Sheets-Sheet 15

INVENTOR.
JAMES M. CUNNINGHAM

BY

G. R. Gugger
AGENT

INVENTOR.
JAMES M. CUNNINGHAM
BY
G. R. Gugger
AGENT

Feb. 7, 1961 J. M. CUNNINGHAM 2,970,878

ELAPSED TIME COMPUTER

Filed Dec. 17, 1953 27 Sheets-Sheet 17

INVENTOR.
JAMES M. CUNNINGHAM

BY

G. R. Gugger
AGENT

INVENTOR.
JAMES M. CUNNINGHAM
BY
G. R. Gugger
AGENT

INVENTOR.
JAMES M. CUNNINGHAM
BY
G. R. Gugger
AGENT

Feb. 7, 1961 J. M. CUNNINGHAM 2,970,878

ELAPSED TIME COMPUTER

Filed Dec. 17, 1953 27 Sheets-Sheet 20

*INVENTOR.*
JAMES M. CUNNINGHAM

*BY*

G. R. Gugger
AGENT

Feb. 7, 1961 J. M. CUNNINGHAM 2,970,878

ELAPSED TIME COMPUTER

Filed Dec. 17, 1953 27 Sheets-Sheet 21

INVENTOR.
JAMES M. CUNNINGHAM

BY

G. R. Gugger

AGENT

INVENTOR.
JAMES M. CUNNINGHAM
BY
G. R. Gugger
AGENT

Feb. 7, 1961

J. M. CUNNINGHAM

ELAPSED TIME COMPUTER 2,970,878

Filed Dec. 17, 1953

27 Sheets-Sheet 23

INVENTOR.
JAMES M. CUNNINGHAM

BY

G. R. Gugger
AGENT

Feb. 7, 1961 J. M. CUNNINGHAM 2,970,878

ELAPSED TIME COMPUTER

Filed Dec. 17, 1953 27 Sheets-Sheet 24

INVENTOR.
JAMES M. CUNNINGHAM

BY

G. R. Gugger
AGENT

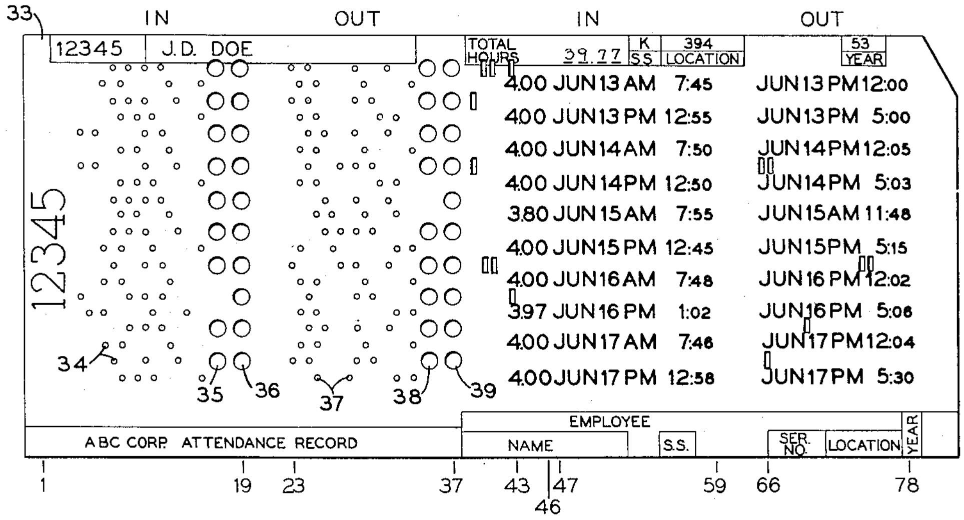
FIG. 34
| DIGIT | A | B | C | D |
|---|---|---|---|---|
| 0 | ● | ● | ○ | ○ |
| 1 | ● | ○ | ● | ○ |
| 2 | ● | ○ | ○ | ● |
| 3 | ○ | ● | ○ | ● |
| 4 | ○ | ● | ● | ○ |
| 5 | ○ | ○ | ● | ● |
| 6 | ○ | ○ | ○ | ● |
| 7 | ○ | ● | ○ | ○ |
| 8 | ○ | ○ | ● | ○ |
| 9 | ● | ○ | ○ | ○ |
FIG. 35
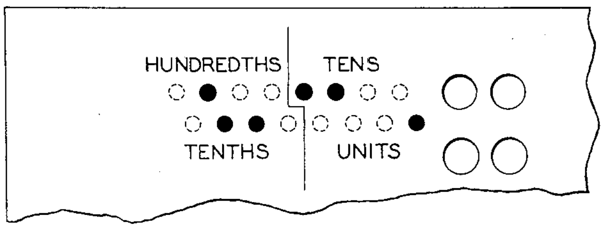
FIG. 36
INVENTOR.
JAMES M. CUNNINGHAM
BY
G. R. Gugger
AGENT Feb. 7, 1961 J. M. CUNNINGHAM 2,970,878

ELAPSED TIME COMPUTER

Filed Dec. 17, 1953 27 Sheets-Sheet 26

INVENTOR.
JAMES M. CUNNINGHAM

BY

G. R. Gugger
AGENT

Feb. 7, 1961 J. M. CUNNINGHAM 2,970,878

ELAPSED TIME COMPUTER

Filed Dec. 17, 1953 27 Sheets-Sheet 27

INVENTOR.
JAMES M. CUNNINGHAM

BY

G. R. Gugger
AGENT 2,970,878

ELAPSED TIME COMPUTER

James M. Cunningham, Endicott, N.Y., assignor to International Business Machines Corporation, New York, N.Y., a corporation of New York Filed Dec. 17, 1953, Ser. No. 398,795

23 Claims. (Cl. 346—66)

This invention relates to improvements in elapsed time recorders.

The present elapsed time recorder has been designed to take care of the growing need of recorders which can compute the elapsed time between two successive operations in a manner such that the computation of time spent on a job or in use with attendance recordings will be automatic. Printing and punching mechanisms are provided for printing the elapsed time and also for recording the elapsed time in the form of small punched holes on a card form, which may be a standard size tabulating card. It is intended that the cards which may be used with this recorder, if tabulating cards, can be used in other accounting machines and thus still further reduce any manual operations which in most instances are still being performed on cards of this nature.

In the preferred embodiment of the invention the only manual operation required is the insertion of the card in the correct slot, either an "In" or "Out" slot. After the card has been inserted sufficiently far to close the start switch it is gripped by feed rolls and carried downward to a card stop, from where it is carried laterally across the recorder until it is stopped in the correct position as determined by positioning holes punched in the card. After the card has been positioned, on an "In" registration, punching of the setting of the elapsed time wheels, printing of conventional time and punching of a positioning hole takes place. The card is then fed laterally to the end of the machine and then down into a stacker. On an "Out" registration the above functions are repeated and sensing of the elapsed time punchings and printing of elapsed time is also made.

Each positioning hole punched in the card, upon being sensed by a line selection sensing mechanism, controls a mechanism for stopping the card in a position so that any printed and punched information will be on the preceding line. One "In" and one "Out" registration are normally made on a single line of the card permitting a total of 12 lines of information on the card equivalent to six full days when the machine is used as an attendance recorder. The positioning holes also serve to indicate if the "In" or "Out" registrations are being made in the proper sequence and control the operation of the recorder accordingly so that the 12 possible lines of printed and punched information will be positioned in the proper relationship to each other.

In a recorder of this type then, wherein start time, stop time and elapsed time data is being computed and recorded on a card in the form of both printing and punchings and where positioning holes are punched for controlling the positioning of the recorded information on the card, it is highly advantageous that the record card upon insertion into the recorder be taken out of the control of the operator and automatically placed under the feeding and positioning controls of the recorder thus insuring a complete accurate record on the card. In the present recorder the many functions outlined above are carried out during each cycle of operation of the machine, which cycle of operation consumes no more time than the cycle of operation required in present day recorders wherein the "In" and "Out" registration times are all that are computed and printed on the cards.

The preferred embodiment of the invention also includes a driving motor which can be started and stopped by two different means and for two different purposes. One starting means is by the insertion of a card and is used to operate feeding, punching, printing, sensing and ejecting mechanisms and is stopped at the end of these successive operations. The other starting means is a cam, operated by a synchronous timekeeping motor, and is used to operate the timekeeping and elapsed time mechanisms. In addition, a program device is provided for controlling the keeping of the elapsed time in such a manner that certain periods such as lunch period, rest period or other similar times out are allowed for. As an added feature the program device also controls the punching of a hole similar to and in line with each positioning hole. This feature makes it possible to visually check the cards to see if they were all inserted in the recorder at the proper time.

It is an object of this invention to provide an improved elapsed time recorder which records time both by printing the time on the card, and by punching holes in the card.

A further object of this invention is to provide an improved elapsed time recorder mechanism which senses a punched card, which automatically goes through a computing cycle utilizing the data obtained by the punching, and which prints the result of the computation as elapsed time.

A further object of this invention is to provide an improved elapsed time recorder wherein upon the insertion of a card, the card is taken out of the control of the operator and automatically placed under control of feeding devices, positioning devices and ejecting devices in the recorder.

In connection with the preceding object, it is a further object to provide devices for automatically feeding the card downwardly to a card stop, then cross-feeding the card laterally to a predetermined position and finally ejecting the card downwardly into a receptacle.

In keeping with the last two objects recited above, a still further object of the present invention is to provide an improved line selection mechanism for laterally positioning the card at the correct printing position during the cross-feeding of the card.

A still further object of this invention is to provide an elapsed time recorder having an improved program tape mechanism for controlling the recording on the card.

In connection with the preceding object, a still further object is to provide a calendar wheel mechanism as a means for selecting between two different programs punched in the program tape and accordingly controlling the operation of the recorder for a regular day schedule or a special day schedule.

A still further object of this invention is to provide an elapsed time recorder having an improved air operated sensing mechanism for sensing the time punchings in the card and controlling the computing of elapsed time accordingly.

A still further object of the present invention is to provide an improved elapsed time recorder wherein there is only one drive motor contact which can be controlled from a time change as well as a recording operation.

A further object of the present invention is to provide an elapsed time recorder having an improved ribbon feed mechanism.

A still further object of the present invention is to provide an improved elapsed time recorder wherein there are provided suitable interlock devices for insuring correct and dependable cooperation between the individual component units of the recorder.

A still further object of the present invention is to provide an improved elapsed time recorder having a novel selective card receiver mechanism.

Other objects of the invention will be pointed out in the following description and claims and illustrated in the accompanying drawings, which disclose, by way of example, the principle of the invention and the best mode, which has been contemplated, of applying that principle.

Figures 6, 7, 7A:
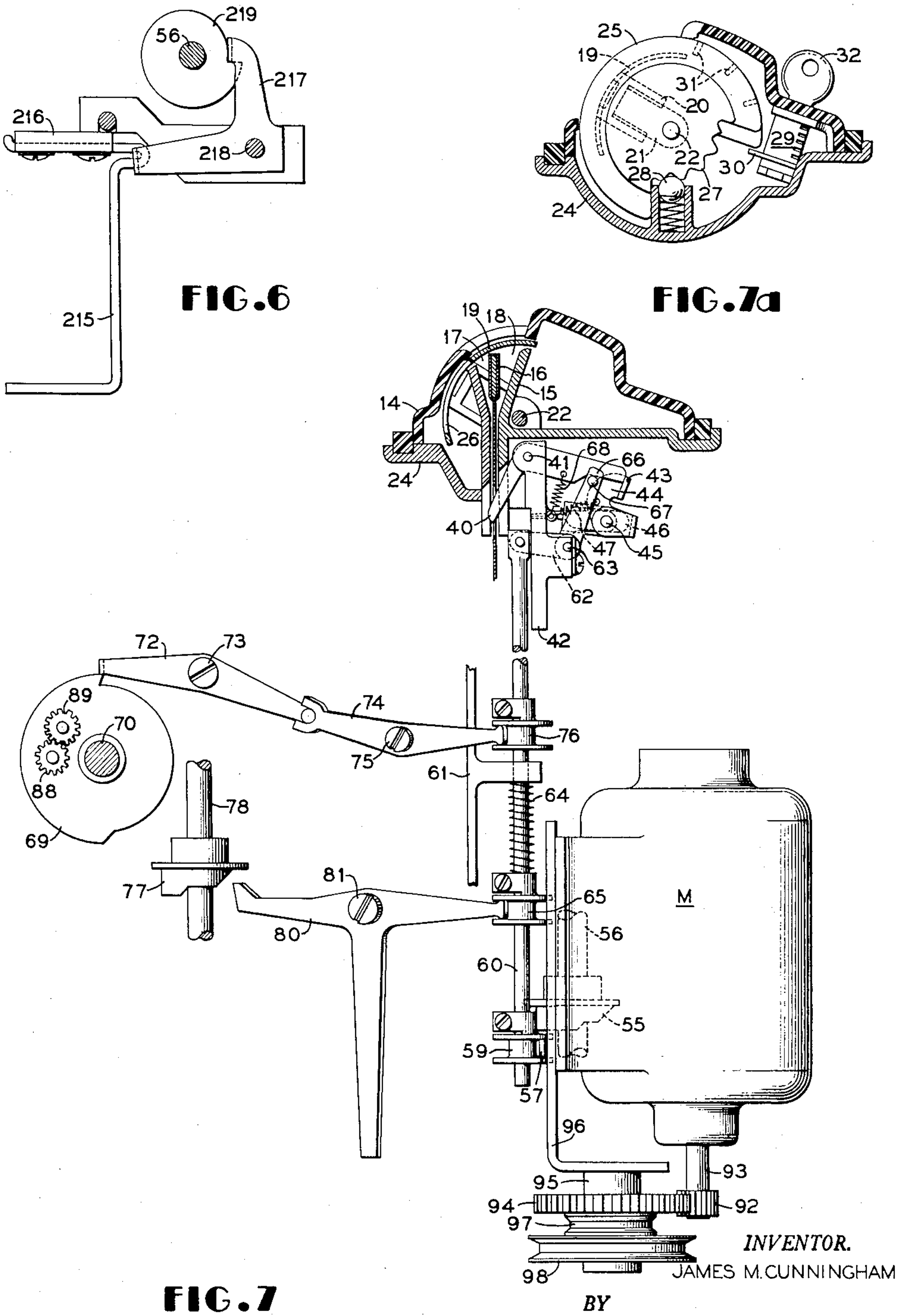
Fig. 6 is a top view of the card flipper mechanism for directing the card into the stacker receptacle.
Fig. 7 is a right-hand view of the drive motor start and stop levers.

Fig. 7*a* is a sectional view of the right-hand end of the card receiver showing the card receiver selecting mechanism.

Figure 2:
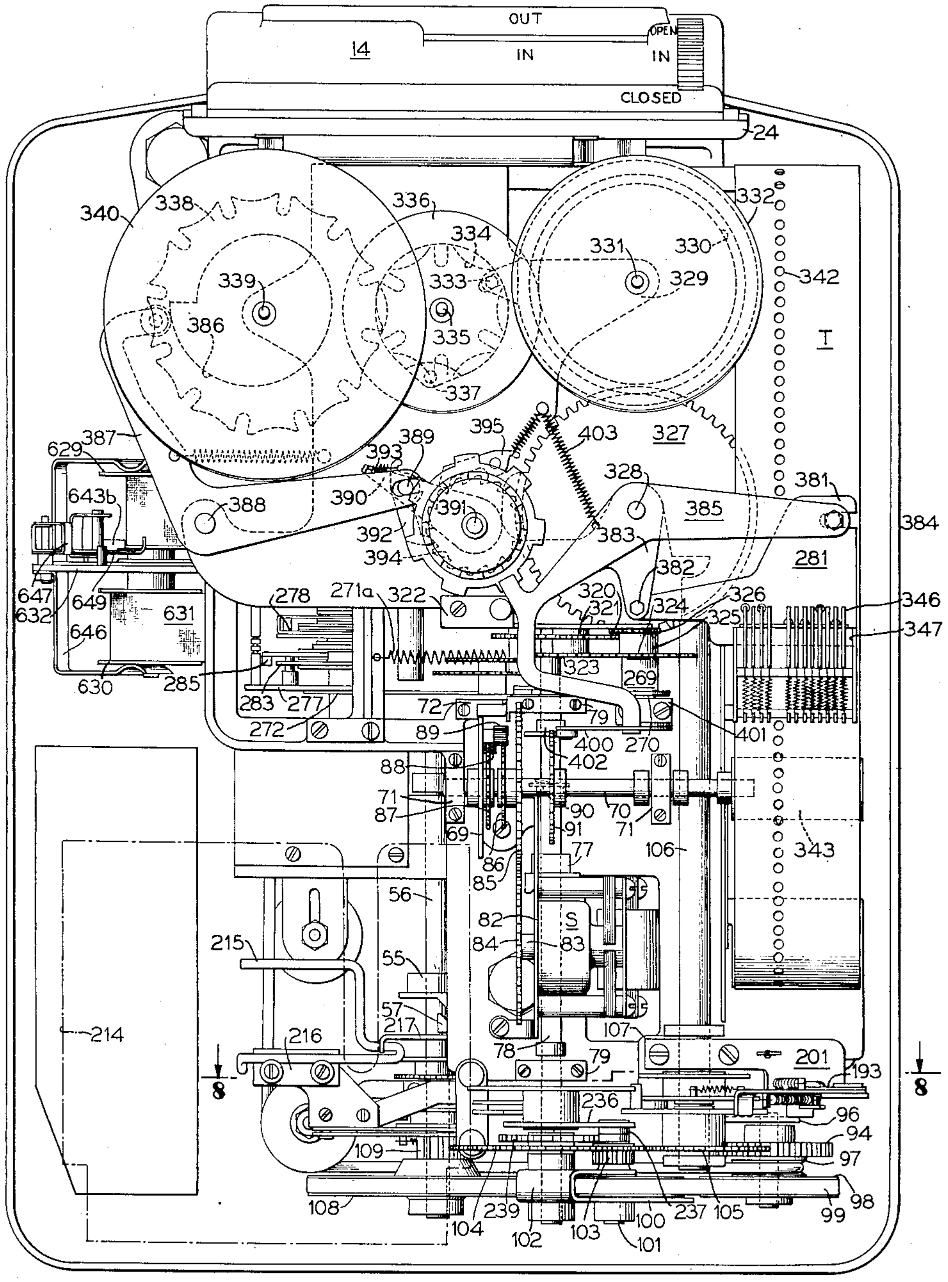
Fig. 2 is a front elevation view of the elapsed time recorder with the front cover removed.
Figure 8:
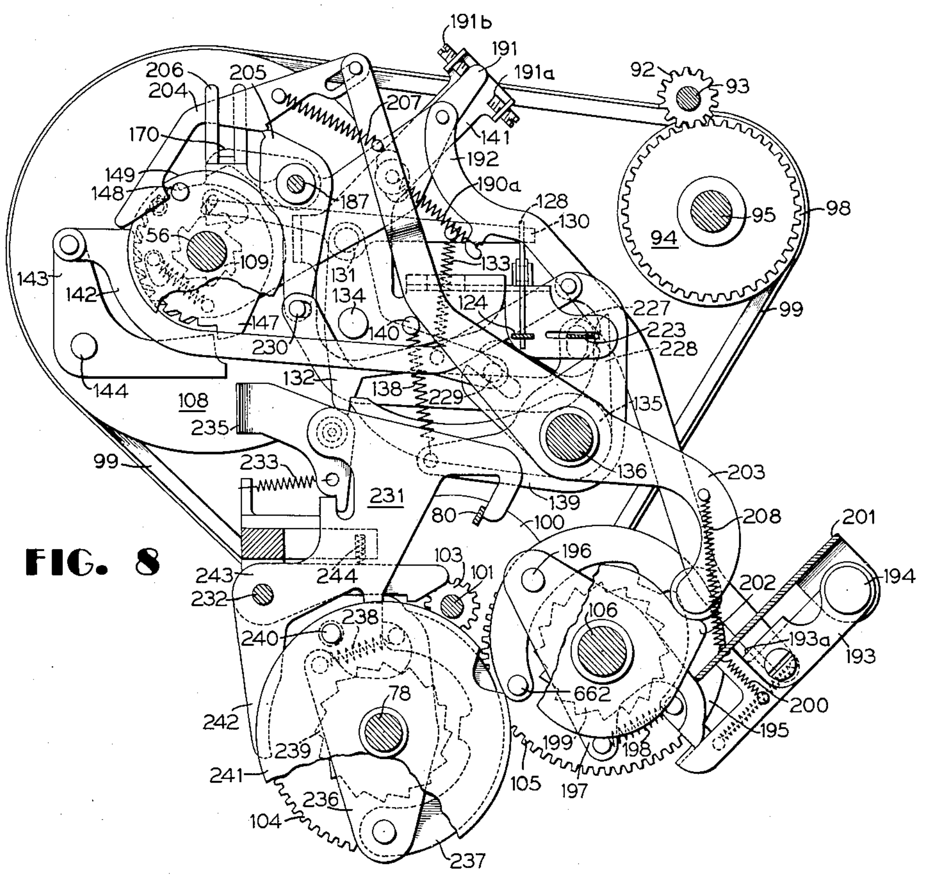

Fig. 8 is a sectional view taken on line 8—8 of Fig. 2, showing a top view of the main drive clutch and feed roll stop mechanism.

Figure 9:
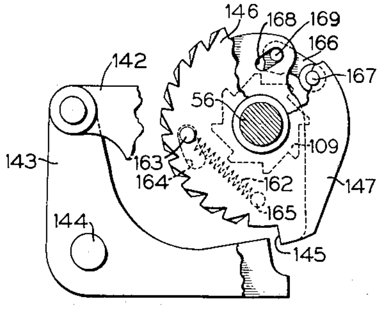

Fig. 9 is a top view of the cross-feed shaft start and stop mechanism.

Figure 10:
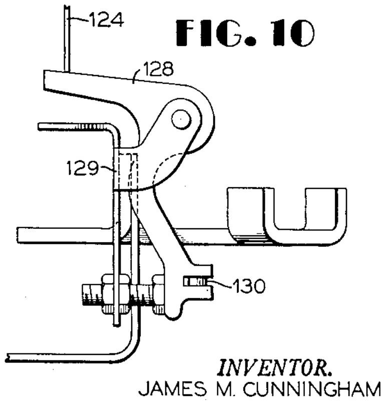

Fig. 10 is a right side view of the recorder feed roll start mechanism.

Figure 4:
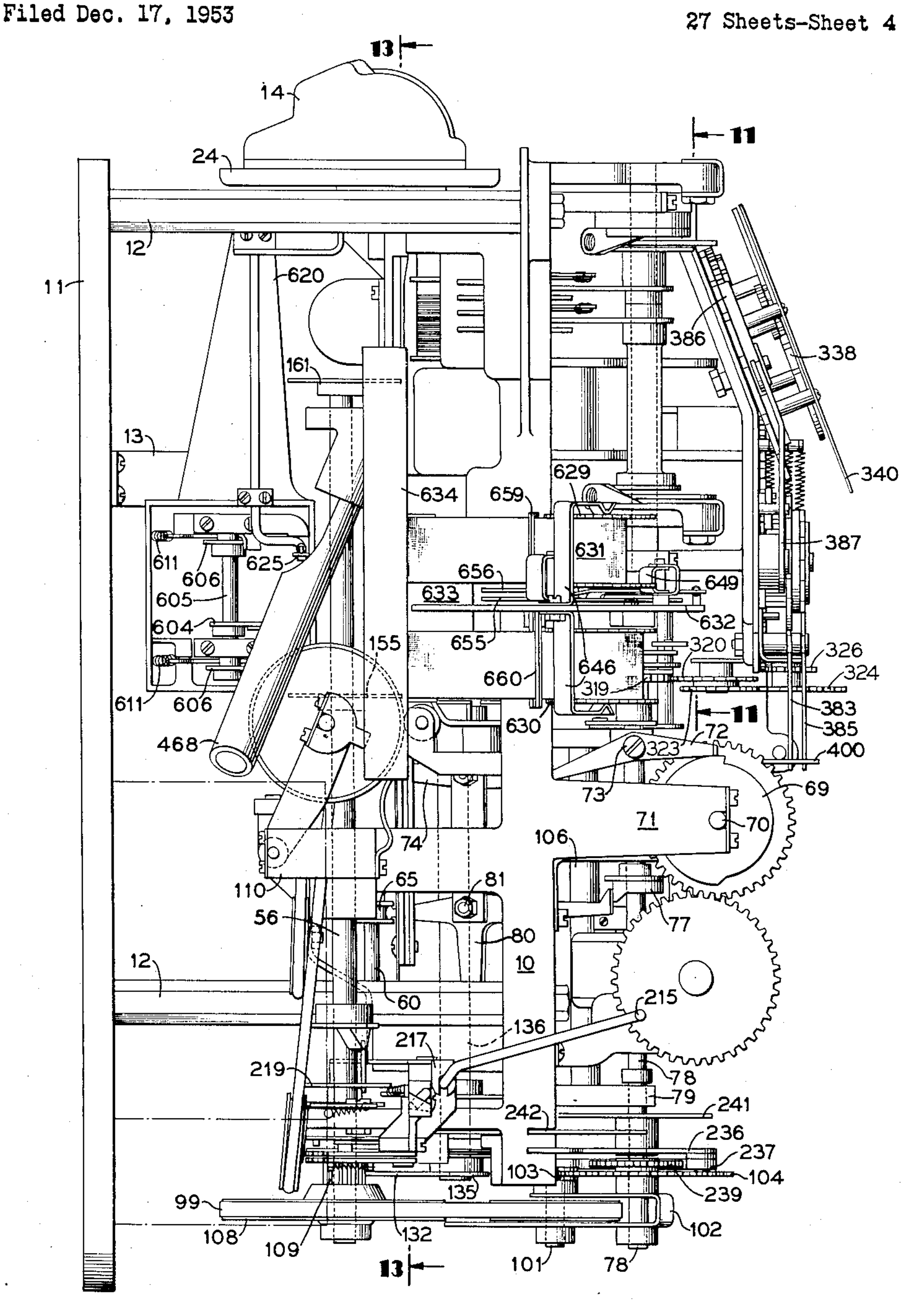
Fig. 4 is a left side elevation view of the elapsed time recorder with the front and side covers removed.
Figure 11:
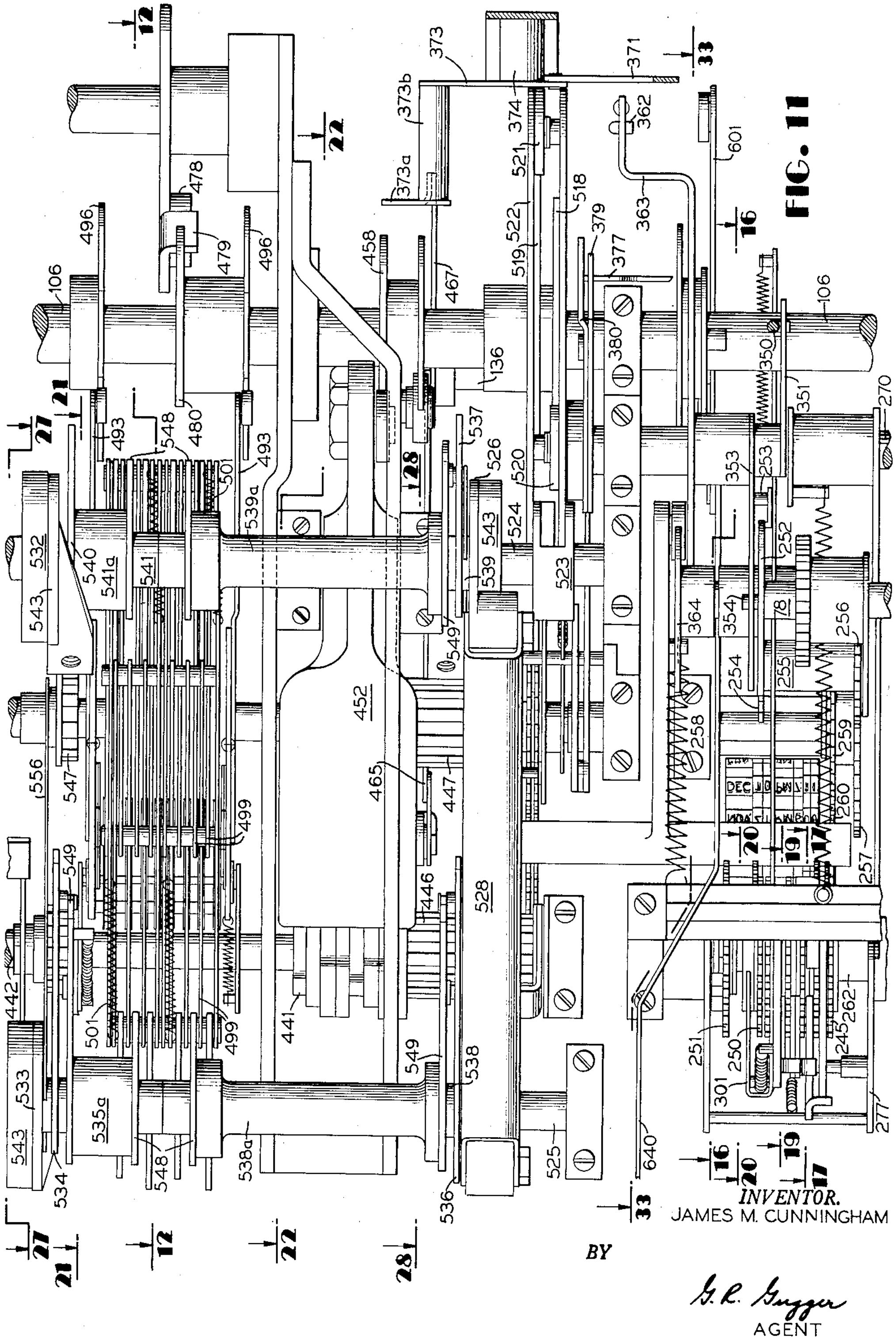

Fig. 11 is a front sectional view taken on line 11—11 of Fig. 4, showing the upper half of the elapsed time recorder with the dial mechanism removed.

Figure 12:
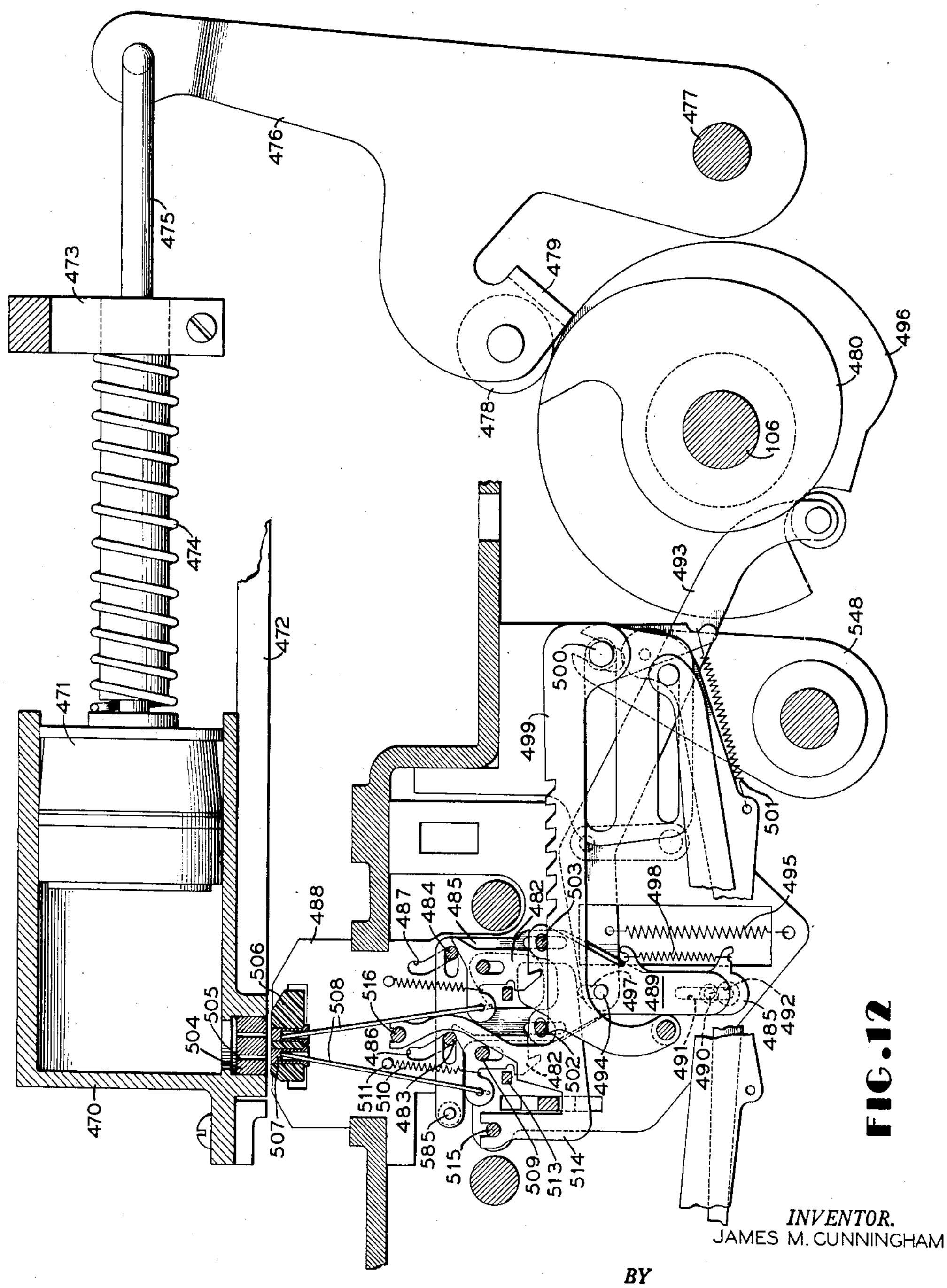

Fig. 12 is a sectional view taken on line 12—12 of Fig. 11, showing the air sensing mechanism.

Figure 13:
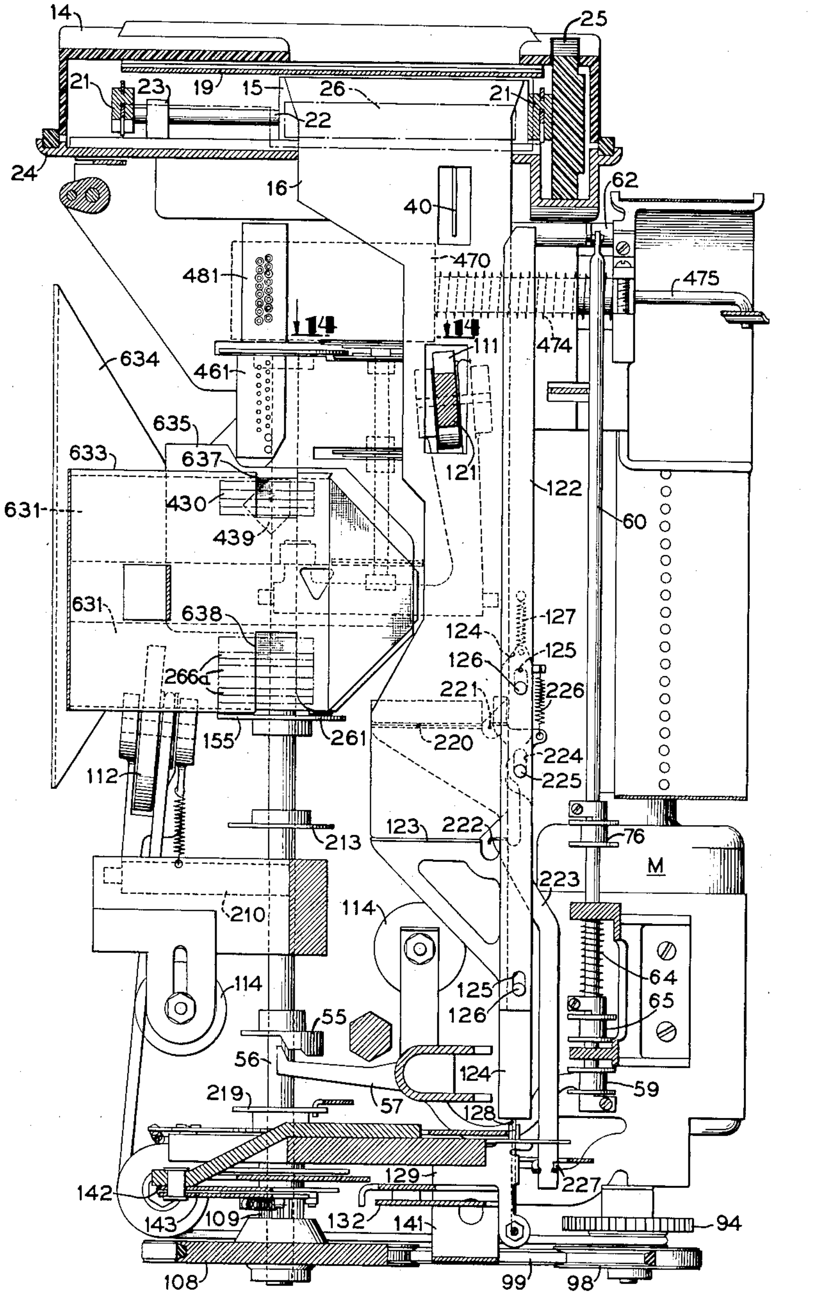

Fig. 13 is a sectional view taken along the card line, line 13—13 on Fig. 4, looking from the card line toward the back of the machine.

Figure 14:
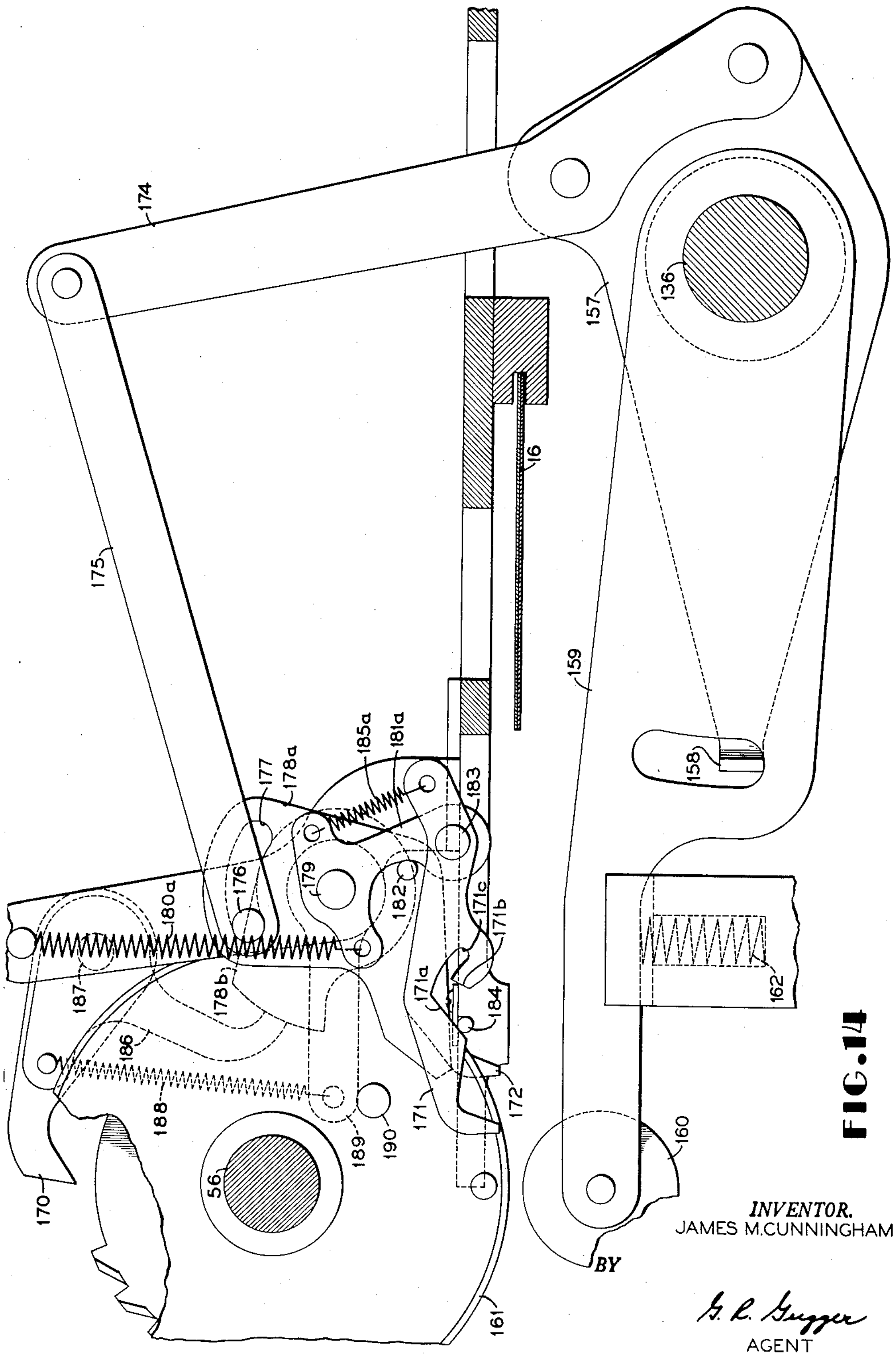

Fig. 14 is a sectional view taken on line 14—14 of Fig. 13, showing the sensing fingers of the line selection mechanism.

Figure 15:
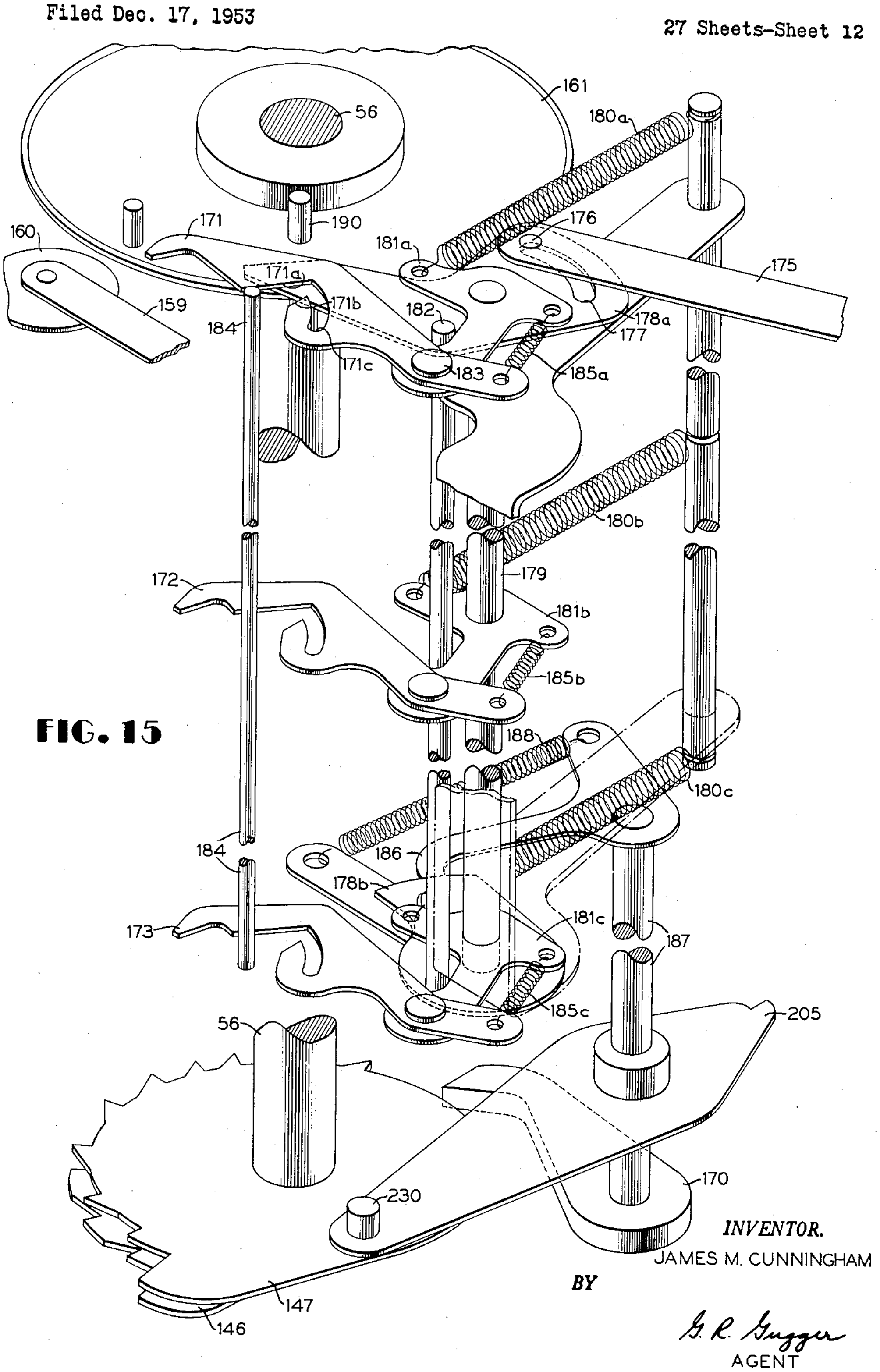

Fig. 15 is an isometric view of the sensing fingers and portions of the line selection mechanism.

Figure 16:
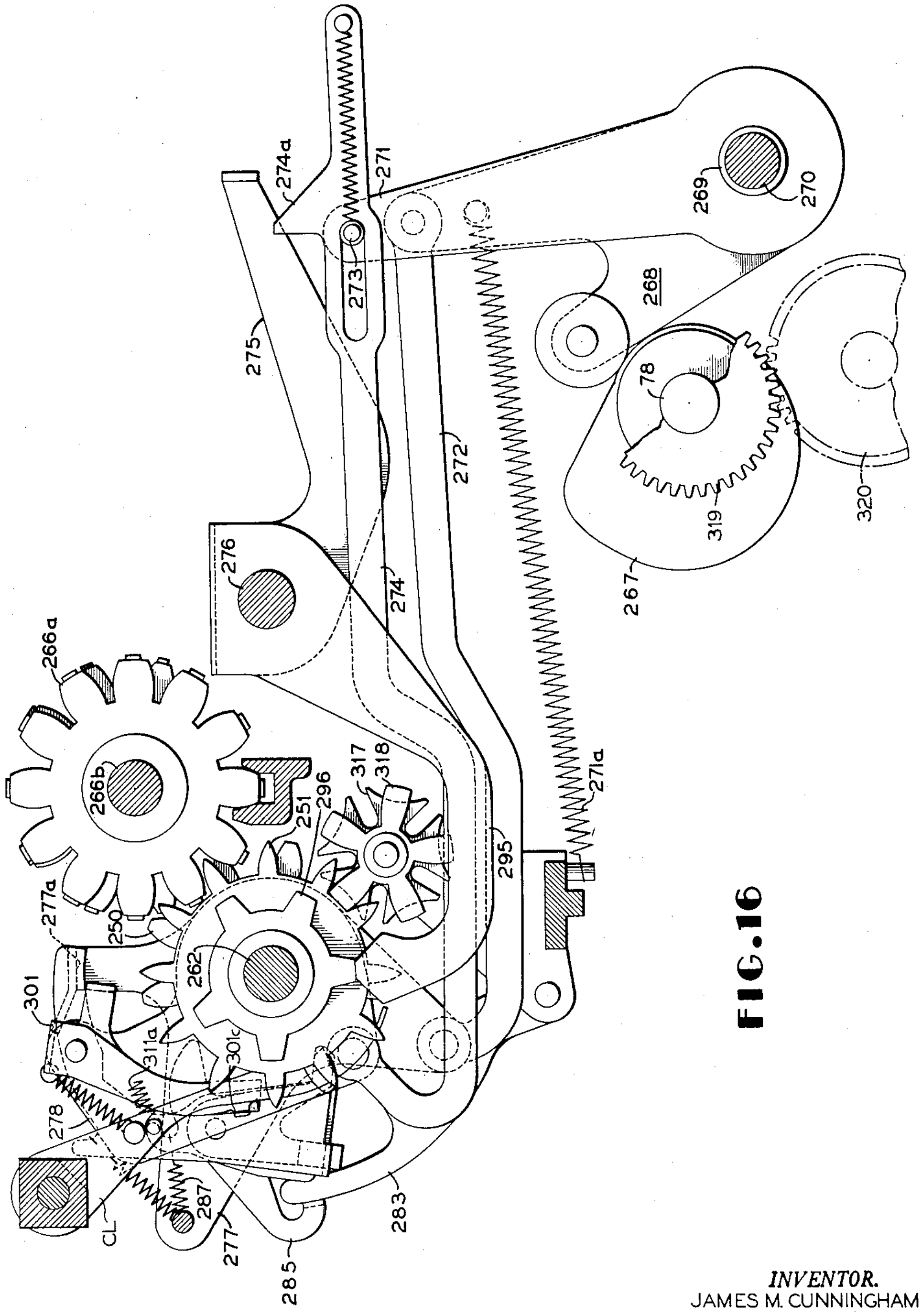

Fig. 16 is a sectional view taken on line 16—16 of Fig. 11, showing a portion of the conventional timekeeping mechanism.

Figures 17, 18, 19, 20:
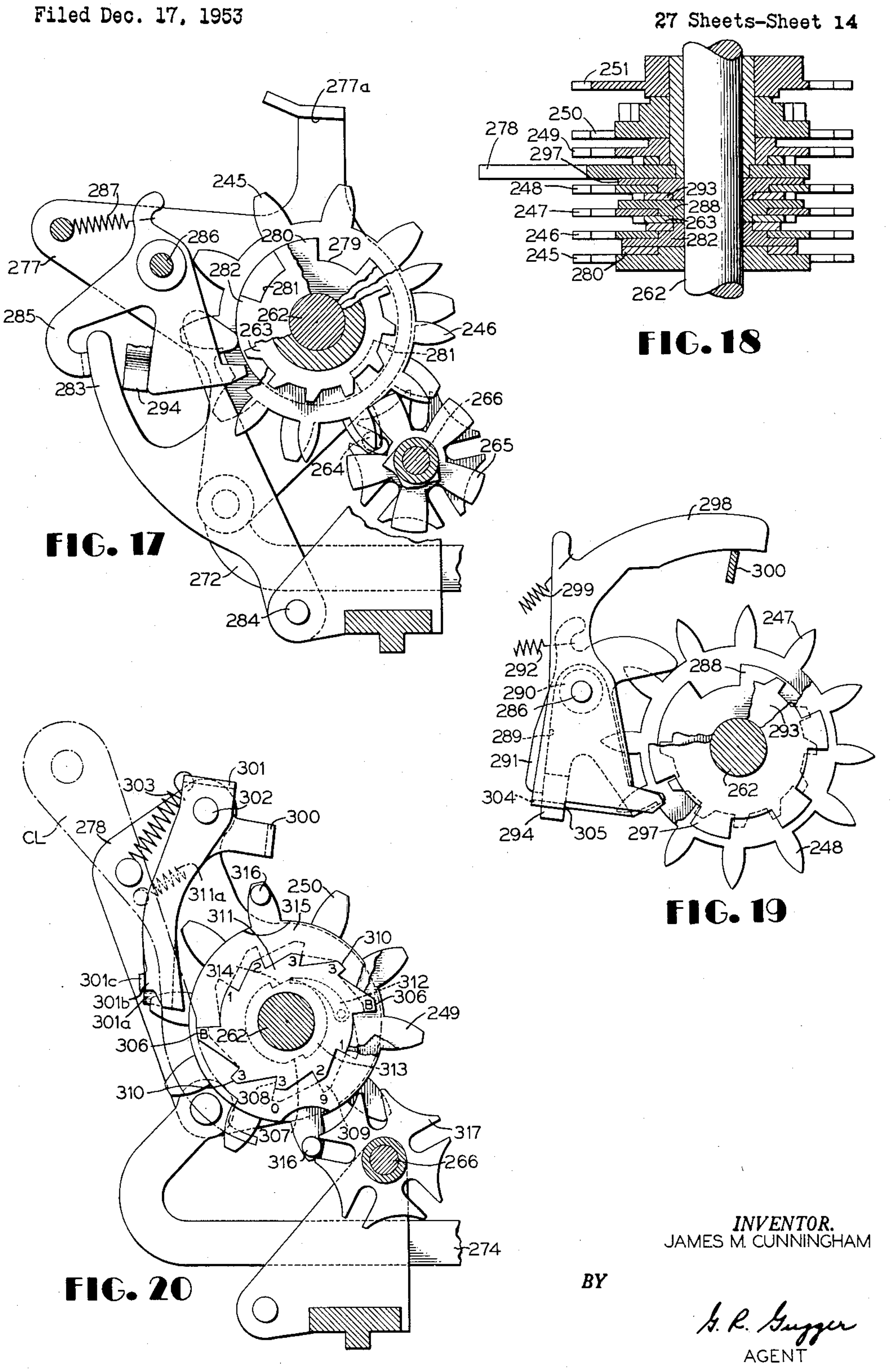

Fig. 17 is a sectional view taken on line 17—17 of Fig. 11, showing the hour and minute feed mechanism.

Fig. 18 is a sectional view showing the conventional timekeeping gear shaft.

Fig. 19 is a sectional view taken on line 19—19 of Fig. 11, showing the feed mechanism for the AM and PM registration.

Fig. 20 is a sectional view taken on line 20—20 of Fig. 11, showing the feed mechanism for the date registration.

Figure 21:
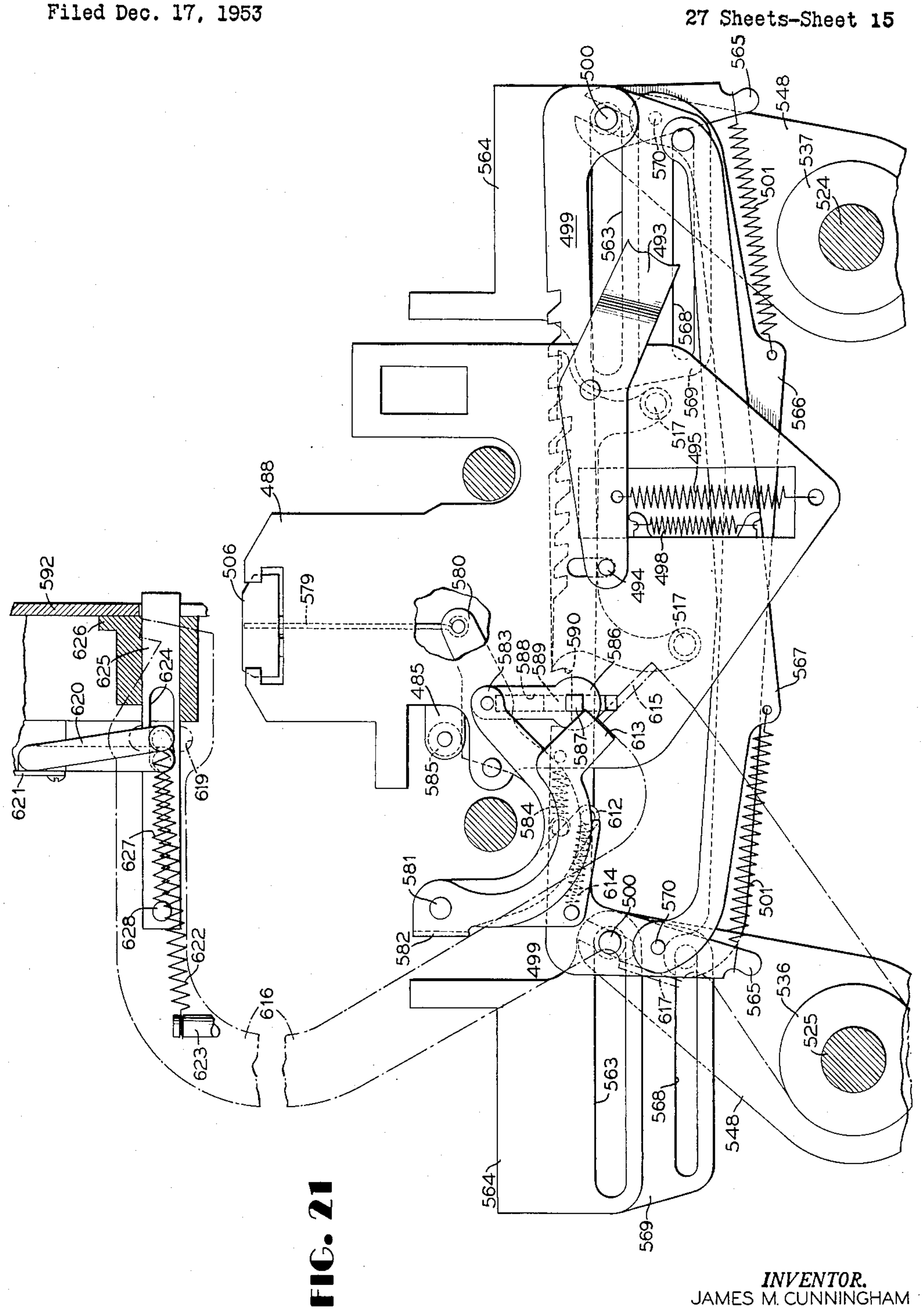

Fig. 21 is a sectional view taken on line 21—21 of Fig. 11, showing the subtraction racks, the print hammer interposer and the sensing wire for the print hammer interposer.

Figure 22:
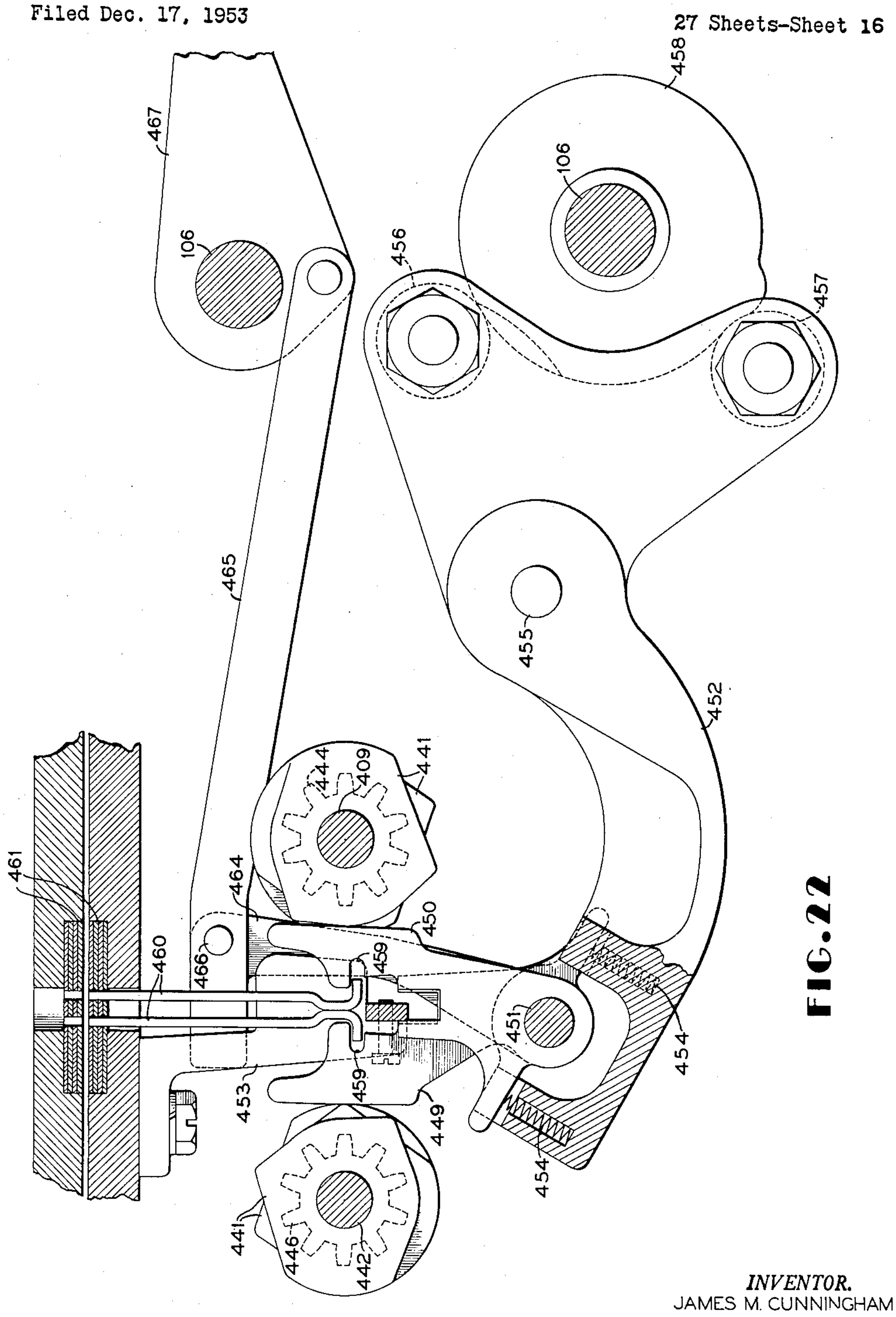

Fig. 22 is a sectional view taken on line 22—22 of Fig. 11, showing the punching mechanism and the controlling means therefore.

Figure 23:
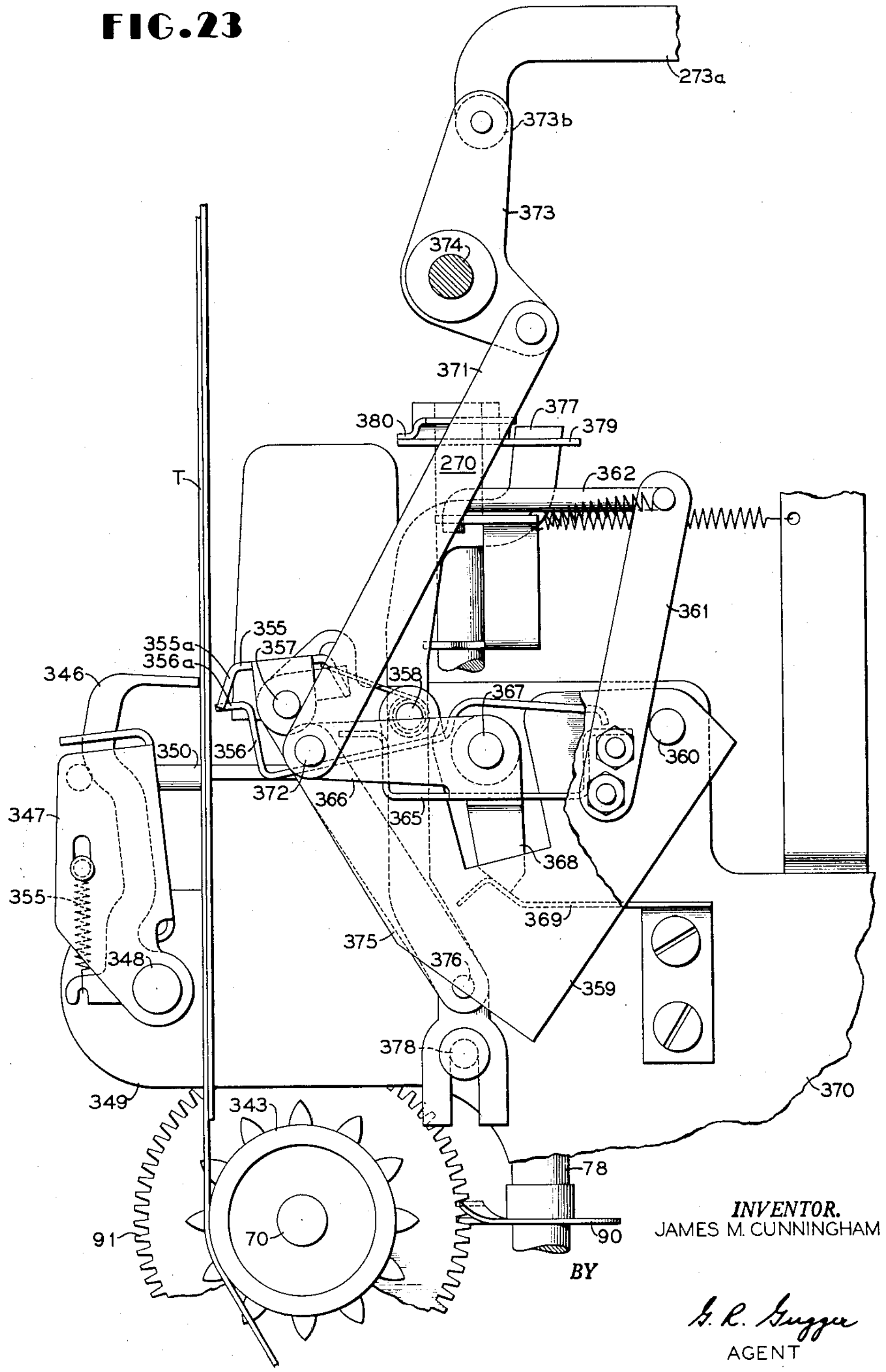

Fig. 23 is a right-hand view of the sensing mechanism for the program tape unit.

Figures 24, 25:
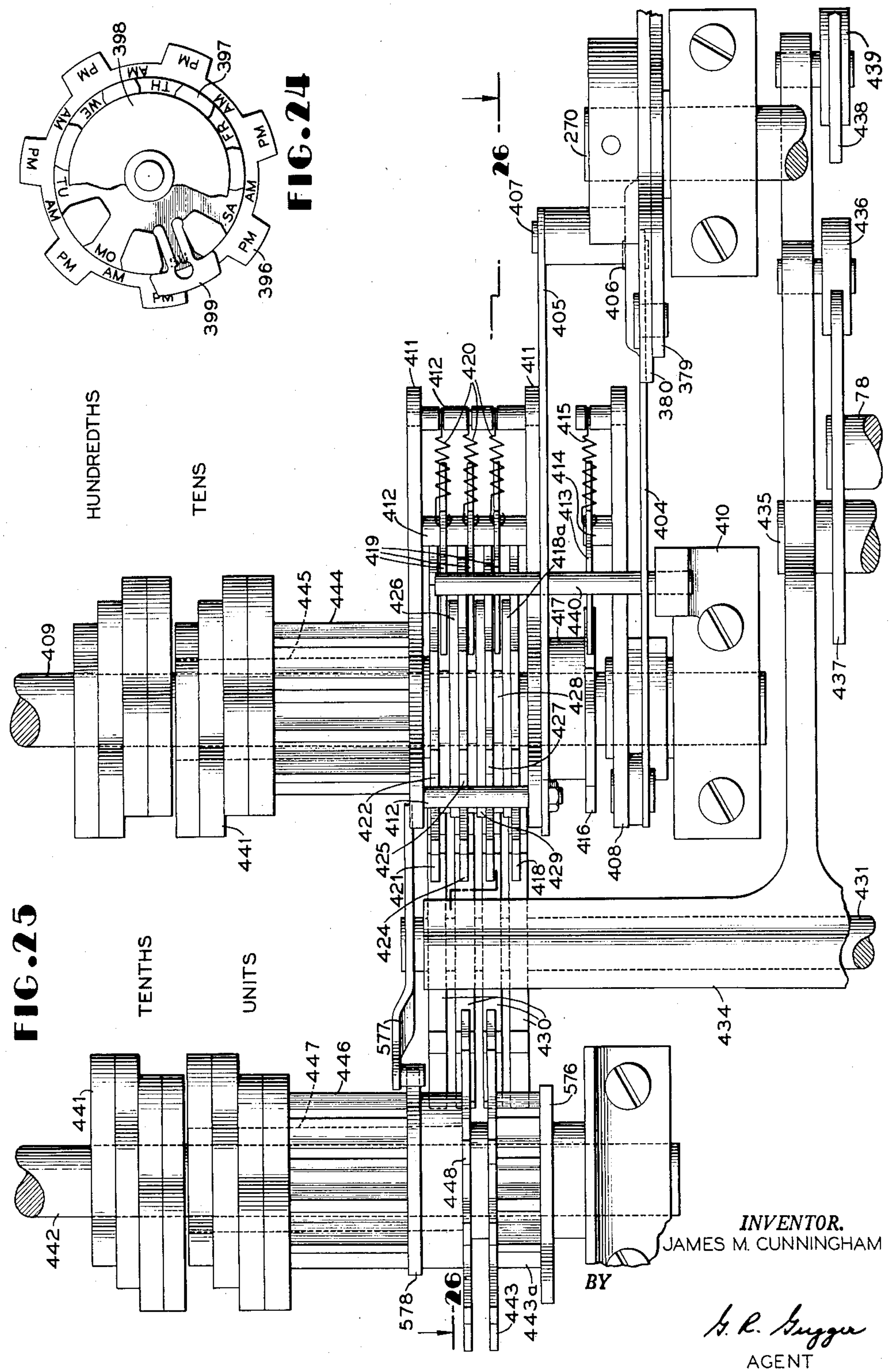

Fig. 24 is a detail view of the day and AM–PM cams of the program unit.

Fig. 25 is a partial front elevation view of the recorder showing the drive to the elapsed time wheels and the elapsed time code cams.

Figure 26:
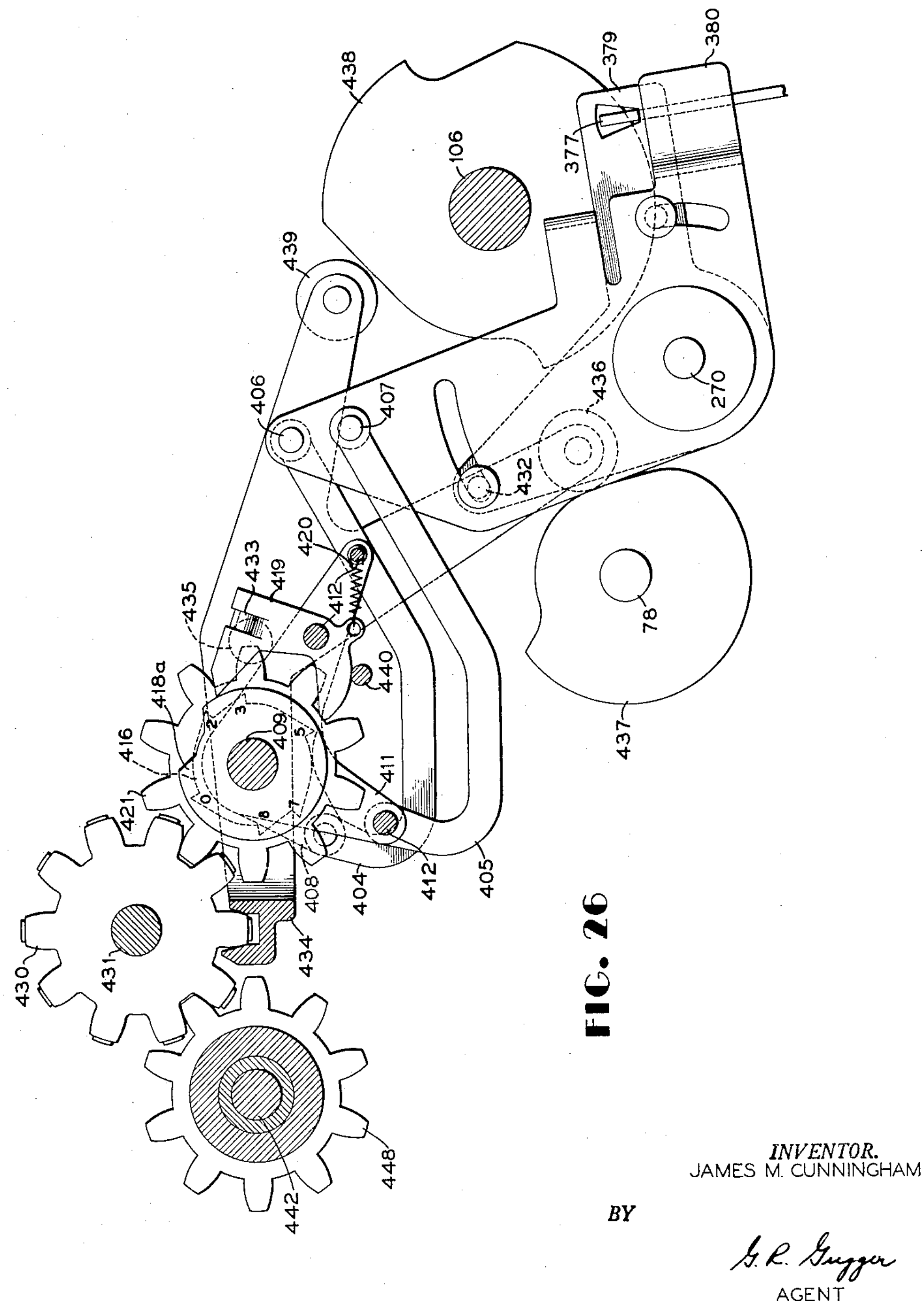

Fig. 26 is a sectional view taken on line 26—26 of Fig. 25, showing the drive for the elapsed time wheels.

Figure 27:
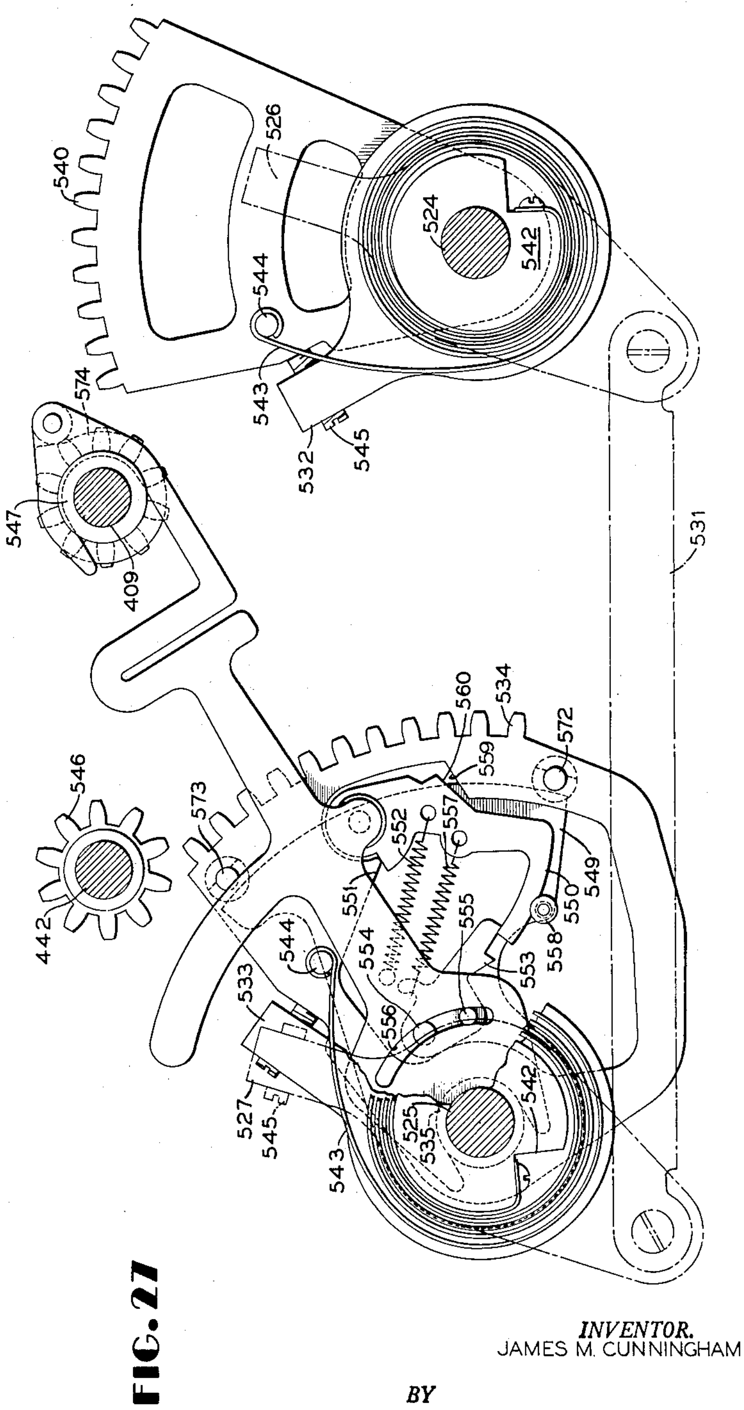

Fig. 27 is a sectional view taken on line 27—27 of Fig. 11, showing a top view of the elapsed time sector gears with borrow pawls for the hundredths and tenths position wheels.

Figure 28:
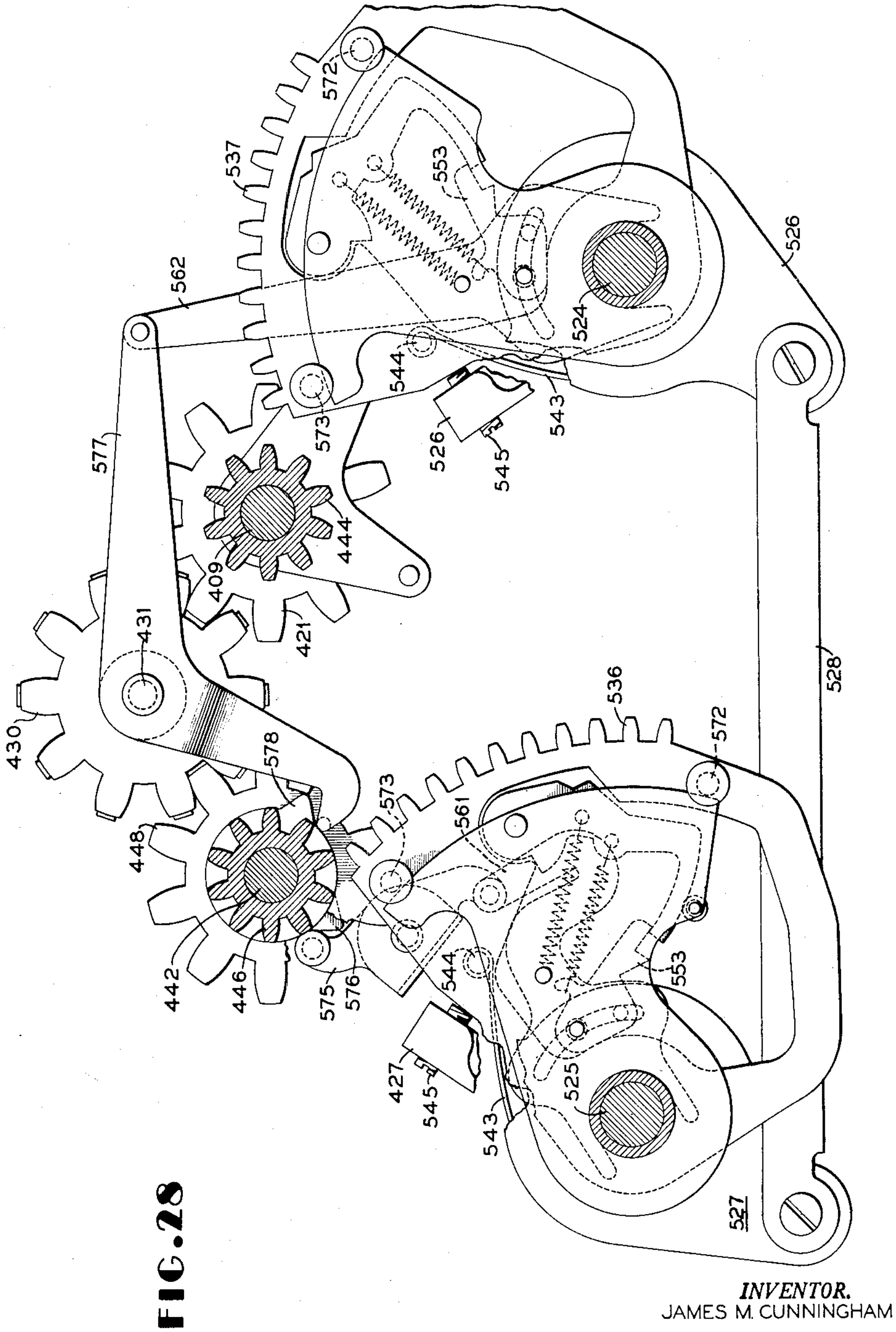

Fig. 28 is a sectional view taken on line 28—28 of Fig. 11, showing a top view of the elapsed time sector gears with borrow pawls for the units and tens position wheels.

Figure 29:
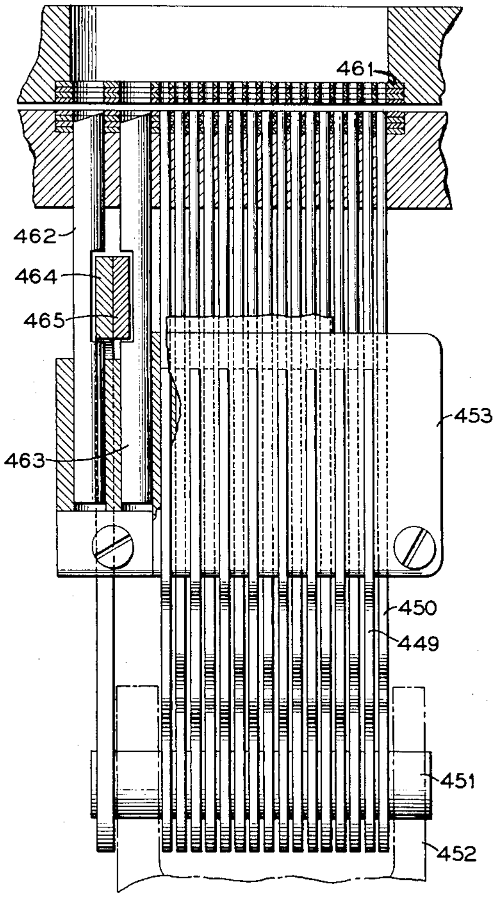

Fig. 29 is a side view of the punch unit mechanism.

Figure 30:
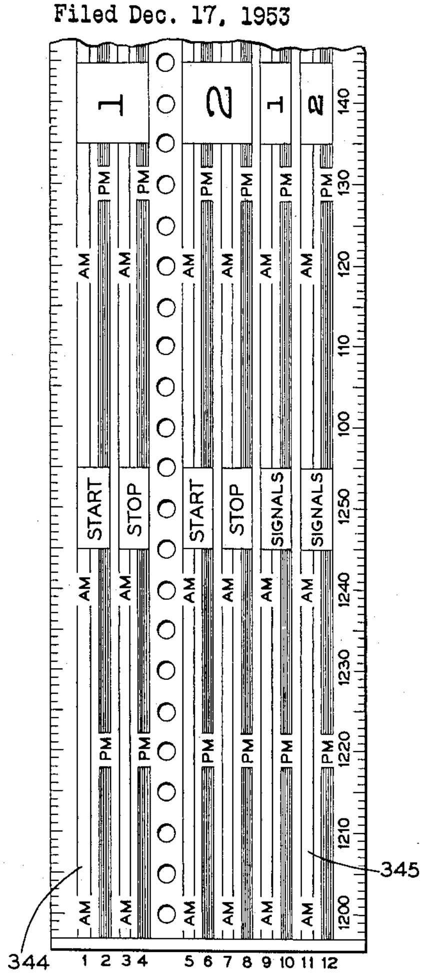

Fig. 30 is a detail view of a portion of the program tape.

Figure 31:
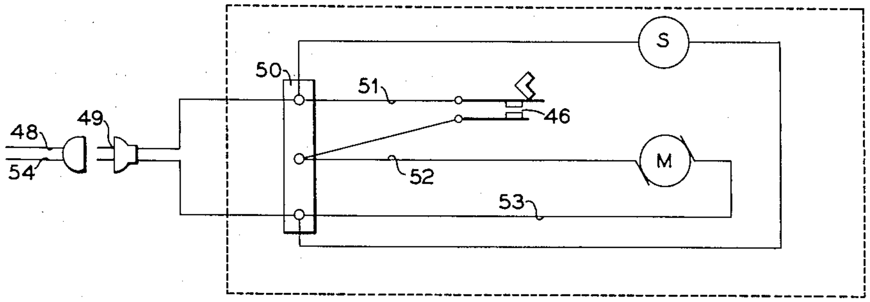

Fig. 31 is a wiring diagram.

Figure 32:
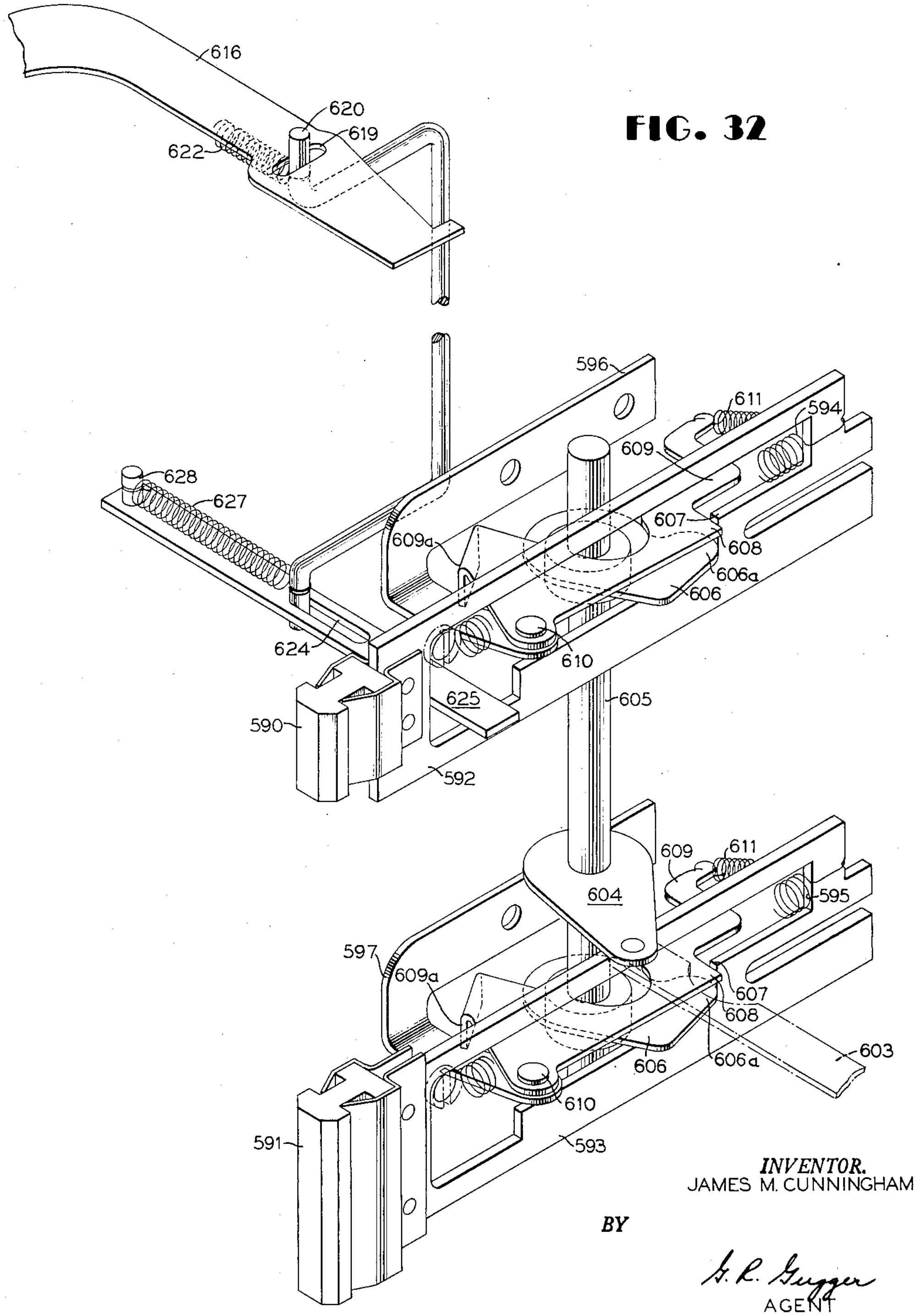

Fig. 32 is an isometric view of the print hammer unit.

Figure 33:
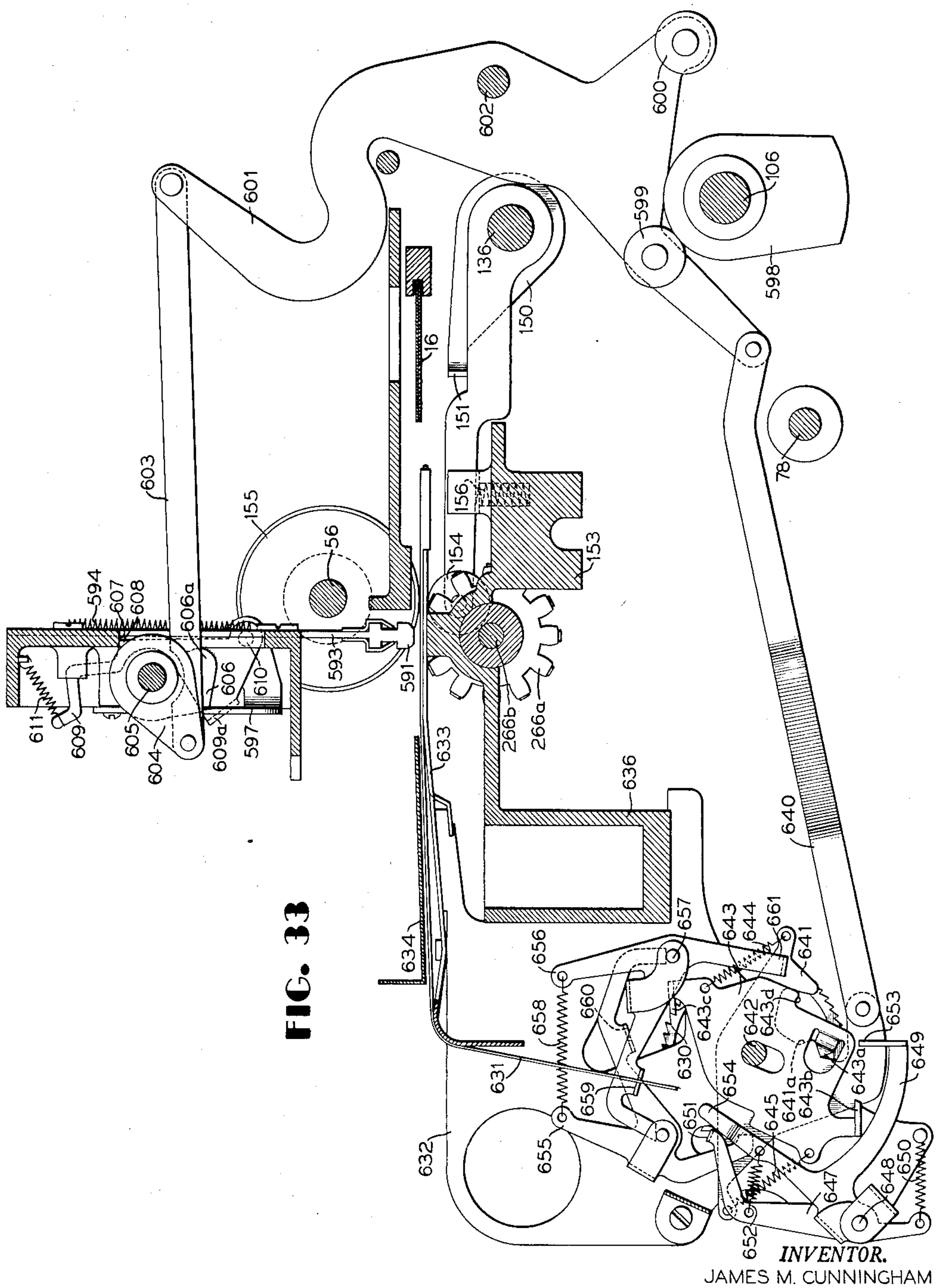

Fig. 33 is a sectional view taken on line 33—33 of Fig. 11, showing the ribbon feed mechanism and the print hammer unit and the drive mechanism for each unit.

Fig. 34 is a view showing the disposition of the recordings on a typical attendance record card which has been processed through the elapsed time recorder for five working days.

Fig. 35 is a view showing the code used for the elapsed time punchings.

Fig. 36 is a view showing an elapsed time code punching for one position on the card.

Figure 37:
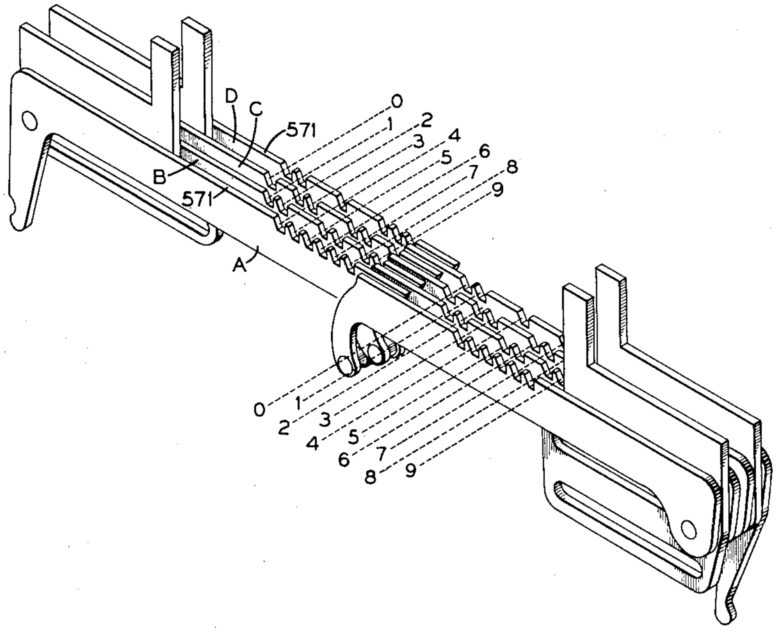

Fig. 37 is an isometric view showing two sets of the subtraction racks.

Figure 38:
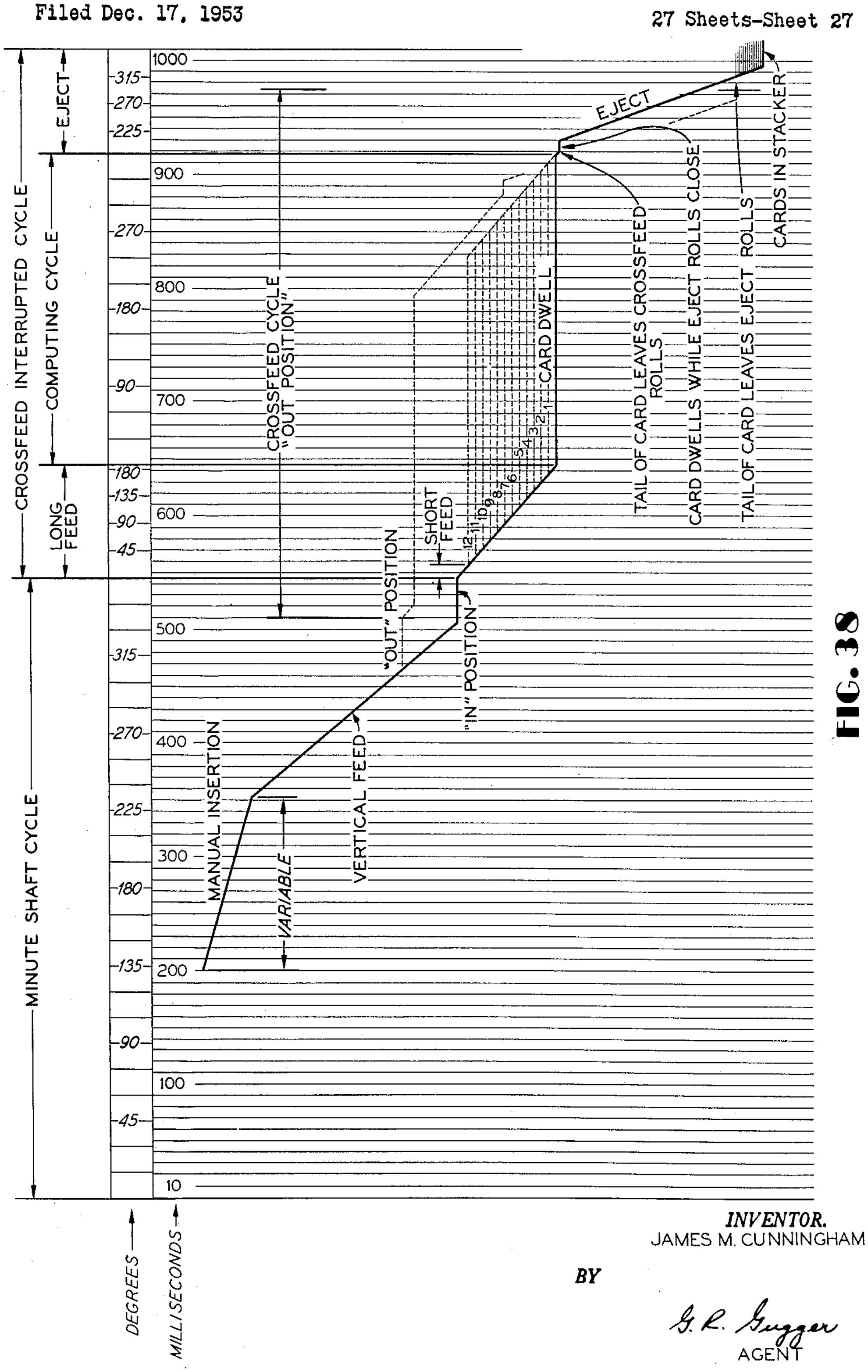

Fig. 38 is a timing chart.

Figure 1:
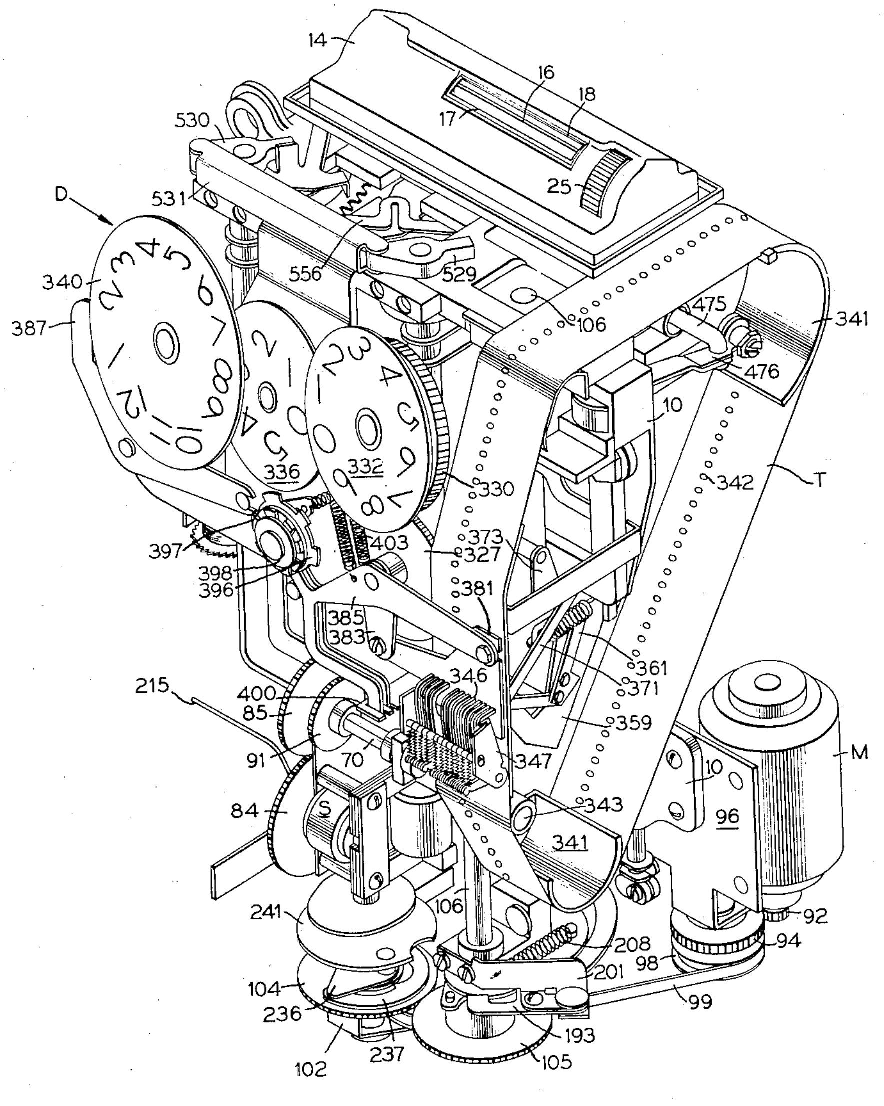
Fig. 1 is an isometric view of a preferred embodiment of the elapsed time recorder with the covers removed.

In the illustrative embodiment of the invention, as shown in Fig. 1, the lower half of the machine comprises the drive motor mechanism M for driving all of the individual units of the recorder and also a synchronous motor mechanism S which controls the operation of the timekeeping units. In the middle front portion and along the right side of the machine is disposed the program tape mechanism T for controlling the periods of time during which elapsed time should be computed. In the upper half of the recorder behind the dial mechanism D are located the current time and elapsed time mechanisms, the punching unit for punching the positioning and checking holes as well as the start and stop time punchings, and the air sensing unit for sensing the time punchings. The novel card feeding mechanism is arranged to transport the card from the card receiver unit, which extends across the top of the machine, down and then across the middle of the machine and downward again into a stacker box at the lower left-hand corner of the machine.

The various components of the recorder are mounted on a main casting unit 10 which in turn is bolted to a back plate 11 (Fig. 4) through a pair of spacer bars 12 and a bracket plate 13. Although not shown in the drawings, there is fastened to the bottom of back plate 11 an open box-like cover which is hinged at the bottom. The cover may be pivoted upward and fastened at the top to completely enclose the recorder or it may be allowed to hang down from the bottom leaving the components of the recorder accessible for service. The front of the box-like cover is provided with a window which exposes a set of time wheels indicated generally at D on Fig. 1. The current time can be read from these time wheels.

*Card receiver and card*

At the top of the recorder is a selective card receiver having a cover plate 14. The card receiver 15 (Fig. 7) comprises a funnel shaped opening in which is mounted a center shield 16 supported on the inclined surfaces at the ends of the card receiver 15 as shown in Fig. 13. As a result there are two openings 17 and 18, into which a card may be inserted. The opening 17 is designated as the "In" or start time opening and the opening 18 is the "Out" or elapsed time opening.

A useful feature of the card receiver is that it can be positioned and locked in any one of four different positions to control the entry of a card into the recorder. The four positions are (1) Closed, wherein no cards may be inserted into the recorder; (2) Open to receive cards in the "In" slot only; (3) Open to receive cards in both the "In" and the "Out" slots; and (4) Open to receive cards in the "Out" slot only. This selective feature is made possible by an arcuate shield 19 which is introduced at the card receiver station as shown in Figs. 7, 7*a* and 13.

The arcuate shield 19 has formed at each end a U-shaped downwardly extending portion 20 (Fig. 7*a*) for allowing the shield to be inserted onto a pair of grooved support blocks 21 fastened to a shaft 22. The shaft 22 is free to rotate and extends through the card receiver frame and through a bearing support 23 (Fig. 13) integral with the base casting 24 of the card receiver unit. At the right-hand end of shaft 22 is fixed a knurled thumb wheel 25 which partially projects through an opening in cover 14 for actuation by the operator.

The shield 19 overlies the card openings and has a cut out portion 26 so that by selectively rotating the knurled wheel 25, any of the four mentioned card receiver positions may be attained. A small circular extension of the right side of the wheel 25 has a toothed portion 27 (Fig. 7*a*) which coacts with a spring mounted ball 28 for detenting the wheel 25 into the desired position. As shown in Fig. 7, both card slots are closed and by rotating the shield 19 clockwise the slots may be selectively exposed to receive a card.

Mounted in the rear right-hand corner of the card receiver unit is a rotatable key barrel 29 (Fig. 7*a*). The key barrel has fixed thereto an arm 30 which extends along the inner side of the thumb wheel 25. The inner side of the thumb wheel has three slots 31 cut therein and it can readily be seen that the arm 30 may be rotated counterclockwise, by turning key 32, and allowed to seat in any of the notches 31 or underneath the cut away portion of the wheel to lock the shield in any of the four positions.

The preferred card form for an elapsed time attendance record card to be used with the present recorder is shown in Fig. 34. The card 33 would normally be prepunched with employee name, number, social security code, location or department number and year; all of which are interpreted at the top of the card. When the card is inserted in the "In" slot, the punchings 34, representing the setting of the elapsed time wheels, are punched in columns 1 to 15; the start time and date are printed in columns 47 to 59, the punching of a positioning hole 35 is made in column 16, and a checking hole 36 is punched in column 18. When the card is inserted in the "Out" slot, the punchings 37, representing the setting of the elapsed time wheels, are punched in columns 23 to 34; the stop time and date are printed in columns 66 to 78, the punching of the positioning hole 38 and the checking hole 39 are made in columns 35 and 37, and the elapsed time is printed in columns 43 to 46. The elapsed time, of course, represents the difference in hours and minutes between the times of insertion in the "In" and "Out" slots of the card receiver. It is to be understood that the card shown and described is merely an illustrative example of one form of card that may be used in the recorder and that there are many other card forms that could also be used.

*Drive motor circuit*

As was previously mentioned, the drive motor M may be started by two different means; namely, by the insertion of a card into the card receiver or from a cam attached to the synchronous timekeeping motor S.

Referring to Fig. 7, when a card is inserted in either the "In" or "Out" slot, the card will actuate a card lever 40 which is pivoted on a stud 41 fixed in a casting member 42. The counterclockwise movement of card lever 40 will permit the lip 43 of a cradle holder 44, pivoted on stud 45, to be disengaged from the end of the card lever. The cradle holder 44 supports a mercury switch 46 and upon being disengaged, the holder will pivot counterclockwise, due to the action of a spring 47, carrying the mercury switch until the switch reaches approximately a horizontal position and is closed circuit-wise. Referring to Fig. 31, with the recorder plugged into the power lines the closure of the mercury switch will complete a circuit from line 48, the plug connection 49, fuse box 50, wire 51, the mercury switch card lever contact 46, wire 52, drive motor M, wire 53, fuse box 50, plug connection 49 and line 54. The motor M thus becomes operative to drive the several units of the recorder.

Figure 3:
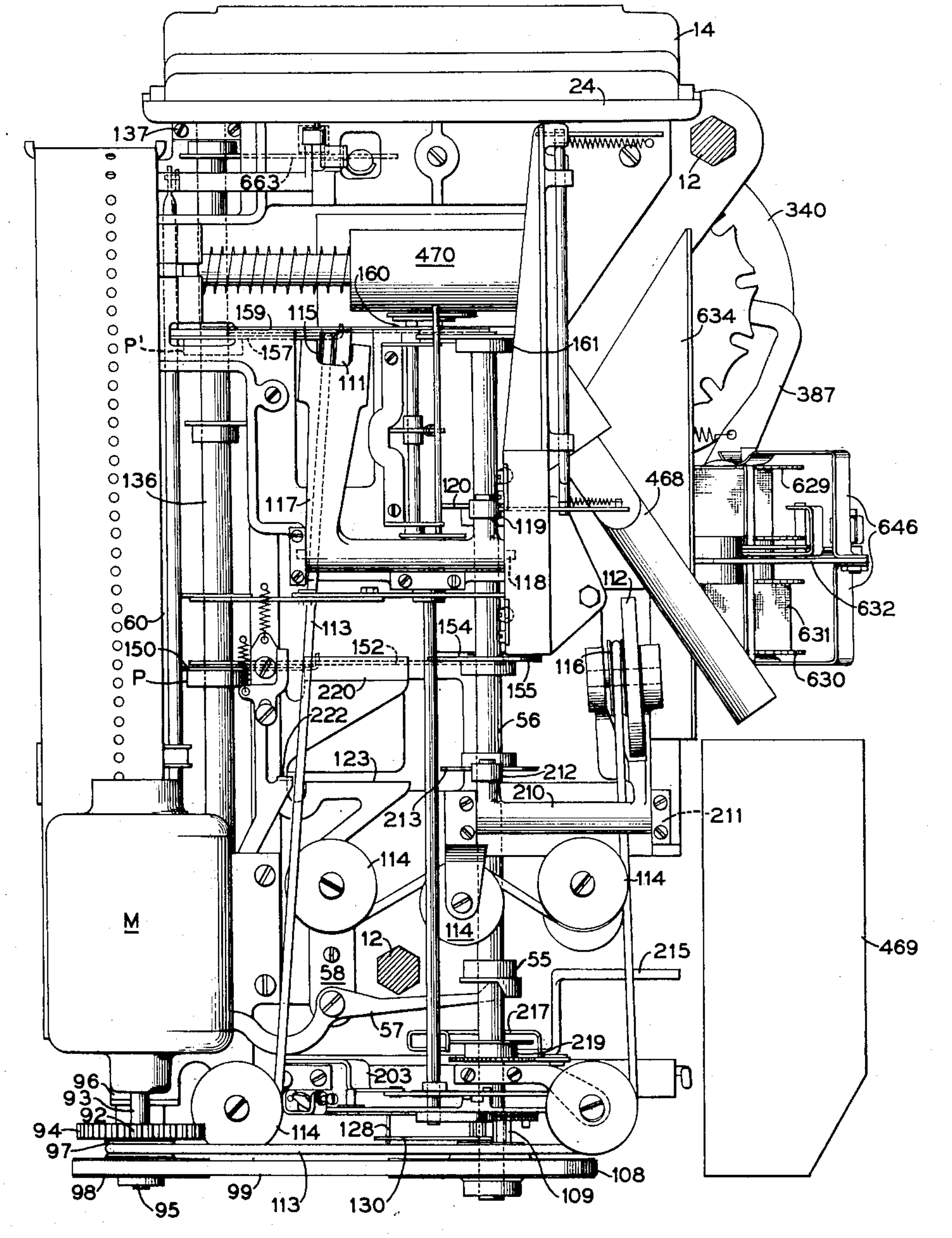
Fig. 3 is a rear elevation view of the elapsed time recorder with the rear cover removed.

The motor calls into operation the various feeding instrumentalities for feeding the card vertically downward to a stop position, cross-feeding the card laterally across the recorder, interrupting the cross-feed of the card long enough so that the necessary registrations may be made and then resuming the cross-feed cycle during the latter portion of which eject rolls are operated to eject the card downward into a stacker box. At the end of the cross-feeding cycle it becomes necessary to stop the motor and for this purpose a cam 55 (Figs. 2 and 7), fixed on a cross-feed shaft 56, will coact with one end of a stop lever 57 which is pivotally mounted to a fixed casting member 58 as shown in Fig. 3. The other end of the stop lever is constrained within a collar 59 fastened on a shaft 60. The shaft 60 is slideably mounted in a casting member 61 (Fig. 7) and is fastened at the top to an arm 62 fastened on a rod 63 which is rotatably mounted in casting member 42. A spring 64 extending between a flanged portion of casting member 61 and a collar 65 fastened on the shaft 60 normally maintains said shaft in its lowest position. Cam 55 will operate to pivot stop lever 57 clockwise forcing the shaft 60 to move upward sufficiently far to allow a bell crank 66, which is fastened to the rod 63, to engage, through a stud 67, the lip 43 and move the cradle holder 44 clockwise thereby opening the mercury switch and the motor circuit. As the lip 43 of the holder moves clockwise, the card lever 40 is pivoted clockwise by means of a spring 68 and prevents the cradle holder 44 from again pivoting counterclockwise and the driving motor remains inoperative.

On a timekeeping cycle, which is utilized to advance the time wheels in a manner to be described, it becomes necessary to again energize the driving motor M. For this purpose there is provided a cam 69 which is journaled on an auxiliary drive shaft 70 journaled in a pair of casting members 71 as shown in Figs. 2 and 4. Cam 69 will permit a drop off of an arm 72, which is pivoted on a stationary stud 73, and is straddled at its other end by a start lever 74. The start lever 74 is pivoted on a fixed stud 75 and has its other end constrained in a collar 76 fastened on the shaft 60. Drop off of arm 72 will pivot start lever 74 clockwise and allow the spring 64 to move shaft 60 downward. This downward movement will pivot the bell crank 66 counterclockwise and cam the card lever 40 upward to permit the lip 43 of holder 44 to disengage, a spreviously described, and close mercury switch 46. Near the completion of the timekeeping cycle a cam 77, fastened on a minute shaft 78 journaled in casting members 79 (Figs. 2 and 4), coacts with a stop lever 80 pivoted on a stationary stud 81. One end of the stop lever 80 is constrained within the collar 65 fastened on shaft 60 to effect the upward movement of shaft 60 and open the mercury switch 46. The driving motor M, then, becomes inoperative again at the end of each timekeeping cycle.

Referring to Fig. 2, the synchronous motor S, provided to operate the conventionl time and the elapsed timekeeping instrumentalities, is shown mounted to a bracket plate 82 which is fastened to the main casting 10 at the front of the machine. The synchronous motor S operates as long as the recorder is plugged in to the power lines 48, 54 (Fig. 31) and through shaft 83 and gear 84 drives a gear 85, which is secured to a gear 86, and both of these gears are rotatable on the shaft 70. A gear 87 is fastened to the shaft 70 and the gears 87 and 86 cooperate with a pair of gears 88 and 89 rotatably mounted on the timekeeping cam 69 and in mesh with each other as shown in Fig. 7.

Cam 69 is advanced in a counterclockwise direction (Fig. 7) continuously by the synchronous motor S at a rate of approximately 3 degrees a minute and when arm 72 drops off the high portion of the cam, the driving motor M will be started in the manner previously described. As will be more fully understood, the express purpose of starting the drive motor at the beginning of each timekeping cycle is to provide a drive to the minute shaft 78 which in turn actuates the time wheels. A timekeeping cycle is taken once every minute as long as the recorder is in operation.

At the end of each timekeeping cycle shaft 60 is moved upward through cam 77, as previously described, and arm 72 is lifted. Immediately thereafter cam 69 is restored in a clockwise direction by a split worm gear 90 (Fig. 2) secured on the minute shaft 78 and in mesh with a gear 91 secured on the shaft 70. This action brings the high portion of cam 69 back under the arm 72 as the driving motor M is being de-energized. If cam 69 should be advanced counterclockwise more than a distance corresponding to one minute, arm 72 will remain on the low portion of said cam and the shaft 60 will be oscillated up and down each minute through the action of cam 77 and spring 64 to effect the restoration of the high portion of the cam underneath the arm 72.

The differential set of gears 84 through 89 acts in such a manner as to be self-regulating within one hour, 180 degrees of cam 69 representing one hour. For example, if for some reason the drive motor M failed to operate for a short time, the synchronous motor S, through said gearing, would still operate cam 69 storing the minute advances thereon. When motor M again becomes operative, the stored minute advances would be transferred to the timekeeping instrumentalities during the restoration of cam 69, said cam being restored through worm gear 90, shaft 91, gear 87 and pinion gears 88, 89.

*Card feeding, positioning and ejecting*

Referring to Figs. 1, 2, 5 and 8, the basic drive comprises a gear 92 fast on the motor drive shaft 93 which meshes with and drives a gear 94. Gear 94 is fastened on a short shaft 95 which is journaled in a support bracket 96 attached to the main casting of the machine. Also fastened on the short shaft 95 is a small pulley 97 and a larger pulley 98. A belt 99 on pulley 98 drives an idler pulley 100 which is fastened on a stud 101 journaled in a support bracket 102, as shown in Fig. 2. Attached to the idler pulley 100 is a pinion gear 103 which engages and drives a time advance gear 104 lose on the minute shaft 78. The time advance gear 104 engages and drives a gear 105 loose on a computing shaft 106 journaled between the top of the main casting and a casting member 107 (Fig. 2).

The belt 99 connects back to the motor pulley 98 around a feed pulley 108 which is fastened to a reamer shaft 109 loosely mounted on the cross-feed shaft 56 journaled in casting member 110 (Fig. 4). As will be seen, suitable clutches are provided to connect the minute shaft, the computing shaft and the cross-feed shaft to their respective drive gears.

In addition to driving the afore-mentioned shafts, the motor M also drives a card feed roll 111 and a card eject roll 112 (Figs. 3 and 5) through the small drive pulley 97 and a belt 113. The belt 113 rides a plurality of guide pulleys 114 suitably journaled to various portions of the machine casting and also rides drive pulleys 115 and 116 which are attached to the feed roll 111 and eject roll 112 respectively. Feed roll 111 is rotatably mounted on an arm 117 (Fig. 3) which is pivoted to the machine casting through a stud 118. A roller follower 119 rotatable on the arm 117 coacts with a cam 120 fastened on the cross-feed drive shaft 56 to cyclically pivot the feed roll 111 against an idle roller 121 (Fig. 13) rotatably mounted on the casting frame. The feed roll 111 is set at a slight angle and not only feeds a card downward but also tends to feed it sideways to align the card against a stationary aligning guide 122 and insure correct positioning of the card.

The card used in the present embodiment of the recorder has a corner cut in the lower right-hand corner, when inserted in the machine, in order to initiate proper operation of the recorder. After a card has been partly inserted into the "In" slot and the motor started, feed roll 111 feeds the card down until the lower edge of the card strikes the lower shelf 123 of a card stop lever 124. The card stop lever is slideably mounted, through slots 125, on studs 126 fastened to the aligner guide 122 and is normally biased in its upper position by springs 127. The receipt of a card moves the card stop lever 124 downward and the bottom end thereof will strike a bell crank 128 (Figs. 10 and 13) pivotally mounted on a support bracket 129. The resultant counterclockwise movement of bell crank 128 will cause a lever 130, mounted in a bifurcated end of said bell crank, to pivot counterclockwise about a stud 131 which is fastened on a latch link 132 (Fig. 8). The movement of lever 130 overcomes the force of a spring 133 which serves to maintain lever 130 in engagement with the bell crank 128.

The continuously running reamer shaft 109 now is engaged with lever 130 and will drive it toward the right. The latch link 132 will now pivot about stud 134 and unlatch a link 135 which is rigidly fastened to a rock shaft 136. The rock shaft is journaled at the bottom in a flange portion of the main casting 10, as shown in Fig. 4, and at the top, in a bracket plate 137, as shown in Fig. 3. A spring 138 (Fig. 8), fastened between a link 139 fast on the rock shaft and a stud 140 fast on a stationary bracket 141, acts to rotate the rock shaft in a clockwise direction when link 135 is unlatched.

Pivotally attached to the link 139, is a relatch link 142 which is now pulled toward the right and carries a ratchet stop lever 143, to which it is pivotally fastened, clockwise about a fixed pivot stud 144. The stop lever 143, is thus, disengaged from the high tooth 145 of a pair of ratchets 146 and 147 on the cross-feed shaft 56 (Figs. 8 and 9) and the cross-feed shaft will be free for rotation to carry out a cross-feed cycle, as will be presently described. The rock shaft 136 will be restored at the end of a cross-feed cycle by a pin 148 which is secured to a plate 149 (Fig. 8) fast on the cross-feed shaft 56. At the end of the cross-feed cycle, pin 148 will cam the relatch link 142 toward the left, causing the rock shaft 136 to pivot counterclockwise to its home position at which point links 132 and 135 will relatch.

The rock shaft mechanism is a part of the cross-feed mechanism provided to selectively feed the card laterally across the recorder and, referring to Fig. 3, there may be seen a pair of pressure roll assemblies mounted on the rock shaft 136 as indicated at P and P′. The lower pressure roll assembly P is shown in detail in Fig. 33 and comprises a link 150, fast on the rock shaft 136, and having an upturned ear 151 which bears against the side of an arm 152 loosely mounted on the rock shaft. The arm 152 is operated in a slot in casting member 153 and has pivoted on its free end an idle roller 154. The idle roller 154 is normally urged against a feed roll 155, secured on the cross-feed shaft 56, by a spring 156 acting against the arm 152 and, as such, is normally operative to feed a card therebetween. The upper pressure roll assembly P′ is shown in detail in Fig. 14 and similarly comprises a link 157, fast on the rock shaft 136, and having an upturned ear 158 which operates in a slot of an arm 159 loosely mounted on the rock shaft. Arm 159 also has pivoted on its free end an idle roller 160 which is normally urged against another feed roll 161, secured on the cross-feed shaft 56, by a spring 162 acting against the arm 159. The idle pressure rolls 154, 160 and feed rolls 155, 161 cooperate to feed a card laterally across the recorder except when the rock shaft happens to have been pivoted counterclockwise, in which case, the pressure rolls 154, 160 will be forced away from the respective feed rolls 155, 161.

The cross-feed shaft 56 is selectively driven through the two ratchets 146, 147 previously mentioned in connection with Figs. 8 and 9. The lower ratchet 146 is slightly smaller than the upper ratchet 147 and floats on the cross-feed shaft 56 while the upper ratchet is secured on said shaft. As shown more clearly in Fig. 9, one end of a spring 162 is fastened to a stud 163, which is attached to upper ratchet 147 and rides in a slot 164 of lower ratchet 146, and the other end is attached to a stud 165 secured to the lower ratchet. When the ratchet stop lever 143 disengages from the high tooth 145, spring 162 will advance the lower ratchet 146 in a clockwise direction about the cross-feed drive shaft 56 until it is somewhat ahead of the upper ratchet 147.

The advancement of ratchet 146 causes a dog 166, which is pivoted on a stud 167 secured to ratchet 147, to engage the continuously running reamer shaft 109 due to the camming action of a slot 168 on a stud 169 secured to the upper end of the dog 166. The cross-feed shaft 56 will now be driven in a clockwise direction as long as dog 166 remains engaged with the reamer shaft 109. The dog 166 will remain engaged until a stop dog 170 (Fig. 14) engages one of the 11 teeth on ratchets 146, 147 depending on the location of the positioning hole punched in the card or it will automatically engage the high tooth 145 if no hole is sensed in the card. When a positioning hole is sensed in the card it will, through a system of levers to be presently described, stop the card in a position so that any printed and punched information will be on the preceding line.

The positioning holes 35, 38 which are punched at each insertion of the card are punched at one position vertically on an "In" registration and in another position on an "Out" registration. To determine the location of these holes there is provided a line selection mechanism (Fig. 15) which is equipped with three sensing fingers; namely, a top sensing finger 171, a center sensing finger 172, and a bottom sensing finger 173. The center sensing finger 172 is positioned to read a positioning hole every time a card is inserted. The other two sensing fingers are provided for the following two special conditions:

(1) If an "In" registration is omitted and two successive "Out" registrations occur, the bottom sensing finger 173 will sense the last "Out" positioning hole and insure that the present "In" registration is made on the next completely blank line. It can readily be seen that if the present "In" registration were made on the line succeeding the last "In" registration, it would then fall on the same line on which the previous "Out" registration had been made and the record would be in error.

(2) If an "Out" registration is omitted and two successive "In" registrations occur, the top sensing finger 171 will sense the last "In" positioning hole and insure that the present "Out" registration is made on the same line as the last "In" registration. If the present "Out" registration were made on the next succeeding line to the last previous "Out" registration it would be on the same line as an "In" registration which was not that corresponding to this present "Out" registration and although elapsed time would be computed it would be erroneous.

Referring to Fig. 14, which shows a view of the top sensing finger mechanism, when the rock shaft 136 is unlatched and rotated clockwise in preparation for cross-feeding a card, a link 174 secured on the arm 157 is also rocked in a clockwise direction. A pitman 175, pivotally attached at one end to the end of link 174, has a stud 176 secured at its other end which rides in a slot 177 of a plate 178*a* pivoted on a shaft 179. The motion transmitted from the rock shaft to stud 176 serves to free plate 178*a* for clockwise movement. A spring 180*a*, which is exerting a clockwise force on a link 181*a* also pivoted on shaft 179, can now operate and the coaction of link 181*a* with a rod 182, secured to plate 178*a*, will pivot the plate 178*a* in a clockwise direction.

The top sensing finger 171, which pivots on a stud 183 secured to link 181*a*, is held against a camming rod 184 by a spring 185*a*. With the clockwise movement of plate 178*a* and link 181*a*, the sensing finger 171 is moved to the left and the coaction between camming rod 184 and a cam surface 171*a* on the sensing finger is such that the sensing finger is in this leftward movement permitted to ride up against the card surface. The spring is still active and tends to impart its clockwise force on plate 178*a* and link 181*a*, but camming rod 184 will strike a surface 171*b* on the sensing finger whenever there is an absence of a hole in the card and prevent any further clockwise movement of plate 178*a* and link 181*a*. When a hole in the card appears, it will permit sensing finger 171 to protrude through the card and cause disengagement of the camming rod 184 from surface 171*b* and consequently spring 180*a* can again impart its clockwise motion to plate 178*a* and link 181*a*. Further movement to the left of the sensing finger will cause the camming rod 184 to enter a slot 171*c* and thereby cam the sensing finger away from the card.

Referring to Fig. 15, it will be noted that for the three sensing fingers there are two plates 178*a*, 178*b*; three links 181*a*, 181*b* and 181*c*; three springs 185*a*, 185*b* and 185*c*; and three springs 180*a*, 180*b* and 180*c*, all associated parts of which act in a similar manner to the one just described. The rod 182 extends from the top link 181*a* past the center link 181*b* to the bottom link 181*c* and ties plate 178*a* rigidly to plate 178*b*. Likewise the camming rod 184 extends from the top sensing finger to the bottom sensing finger.

When a hole is sensed, plates 178*a* and 178*b* are moved in a clockwise direction and a cam follower arm 186, which is secured to a rod 187, will drop off the cam surface of plate 178*b* and will pivot the rod 187 counterclockwise due to the force exerted by a spring 188. The spring 188 extends from one end of the cam follower arm to a support arm 189 secured on the shaft 179. The counterclockwise movement of rod 187 will permit the stop dog 170, which is secured to the shaft, to engage a tooth on the ratchets 146, 147 and thus stop the cross-feed shaft 56 to terminate the lateral feed of the card.

It is to be noted that any one of the three sensing fingers can effect the stopping of the cross-feed shaft. Under certain conditions two of the fingers may find a hole, but since they are synchronized, they will act as one.

The top sensing finger 171 is longer than either finger 172 or 173, both of which are the same length, by the distance between two successive positioning holes. The purpose of this long top sensing finger is to stop the card one line ahead of its normal stopping position as required whenever the second special condition, previously described, arises.

In order to prevent an overthrow of plates 178*a* and 178*b* when released by pitman 175 and thus perhaps cause an engagement of the stop dog 170 and an incorrect positioning of the card, a leg of plate 178*a* coacts with a stud 190, secured on the cross-feed roll 161. The sensing fingers will drop as far as the card line at which point the leg on plate 178*a* will engage the stud 190. As soon as the cross-feed shaft 56 starts to rotate, stud 190 becomes disengaged and the sensing fingers are in position to sense a hole.

It has been shown, thus far, how a card is fed vertically downward to a card stop, how the rock shaft is operated as a result thereof, and how the cross-feed clutch is engaged to feed the card laterally past the sensing fingers until a positioning hole is sensed at which time the cross-feed clutch is disengaged and the card stopped in the correct position for printing and punching operations. Referring to the timing chart in Fig. 38, it will be seen that after the card has been stopped at any one of the 12 line positions there is a dwell in the feed cycle while the recorder goes through an elapsed time computing cycle. The computing cycle will be described in detail later, however, the clutching on and off of the computing shaft will be discussed now since it effects the feeding of the card.

Referring to Fig. 8, the computing shaft 106 is started when the stop dog 170 engages any of the teeth in the ratchets 146, 147. The clockwise motion of the ratchets will overcome the tension of a spring 190a and force the stop dog 170 to the right and a stop dog carrier arm 191, connected to the stop dog through the rod 187, is pivoted clockwise about the cross-feed shaft 56 until its top end strikes against a screw stud 191a in bracket 141. A link 192, pivotally connected at one end to the carrier arm 191 is thus moved and pivots a latch lever 193, connected to the other end of said link, in a counterclockwise direction about a fixed stud 194. Latch lever 193 will unlatch a computing clutch dog 195, which is pivoted by a pin 196 to a dog carrier plate 197 fastened to the computing shaft 106. A spring 198 will now pivot the clutch dog 195 into engagement with a ratchet sleeve 199 loose on the computing shaft and attached to the loosely mounted continuously running gear 105. The drive from gear 105 is thus transmitted to the computing shaft 106.

The computing shaft 106 will make one complete revolution during which time the pin 196 will strike the link 192 camming it slightly counterclockwise to unlatch the latch lever 193 at 193a. The latch lever 193 will be restored into the path of the clutch dog 195 by a spring 200 fastened to a bracket plate 201 and at the end of one revolution will intercept the clutch dog 195 and stop the computing shaft.

Also during the rotation of the computing shaft, the high portion of a cam 202, secured on said shaft, coacts with a roller follower arm 203 pivotally mounted on the rock shaft 136. The follower arm 203 is gradually pivoted counterclockwise to allow a latch link 204, pivoted on the other end of the follower arm, to move toward the left and get in front of the latching surface of an arm 205 secured on the rod 187. The latch link 204 moves in a guide bracket 206 and is normally biased against arm 205 by a spring 207. At the end of the rotation of the computing shaft, the follower arm 203, under the influence of a spring 208, will pivot clockwise into a recess in cam 202, as shown in Fig. 8. As a result the latch link will be drawn toward the right causing the rod 187, arm 205 and stop dog 170 to pivot clockwise. The stop dog is latched clear of the teeth on the ratchets 146, 147 and said ratchets again become effective to clutch in the cross-feed shaft 56 and initiate a second cross-feed cycle to complete the feeding of the card. The latch link 204 will stay latched until near the end of the cross-feed cycle when the pin 148 on plate 149 will strike the latch link 204 and unlatch same from the arm 205. Spring 190a fastened between bracket 141 and link 192 will restore the stop dog 170 and arm 205 back to their normal position with the top end of the carrier arm 191 against a screw stud 191b in bracket 141.

Figure 5:
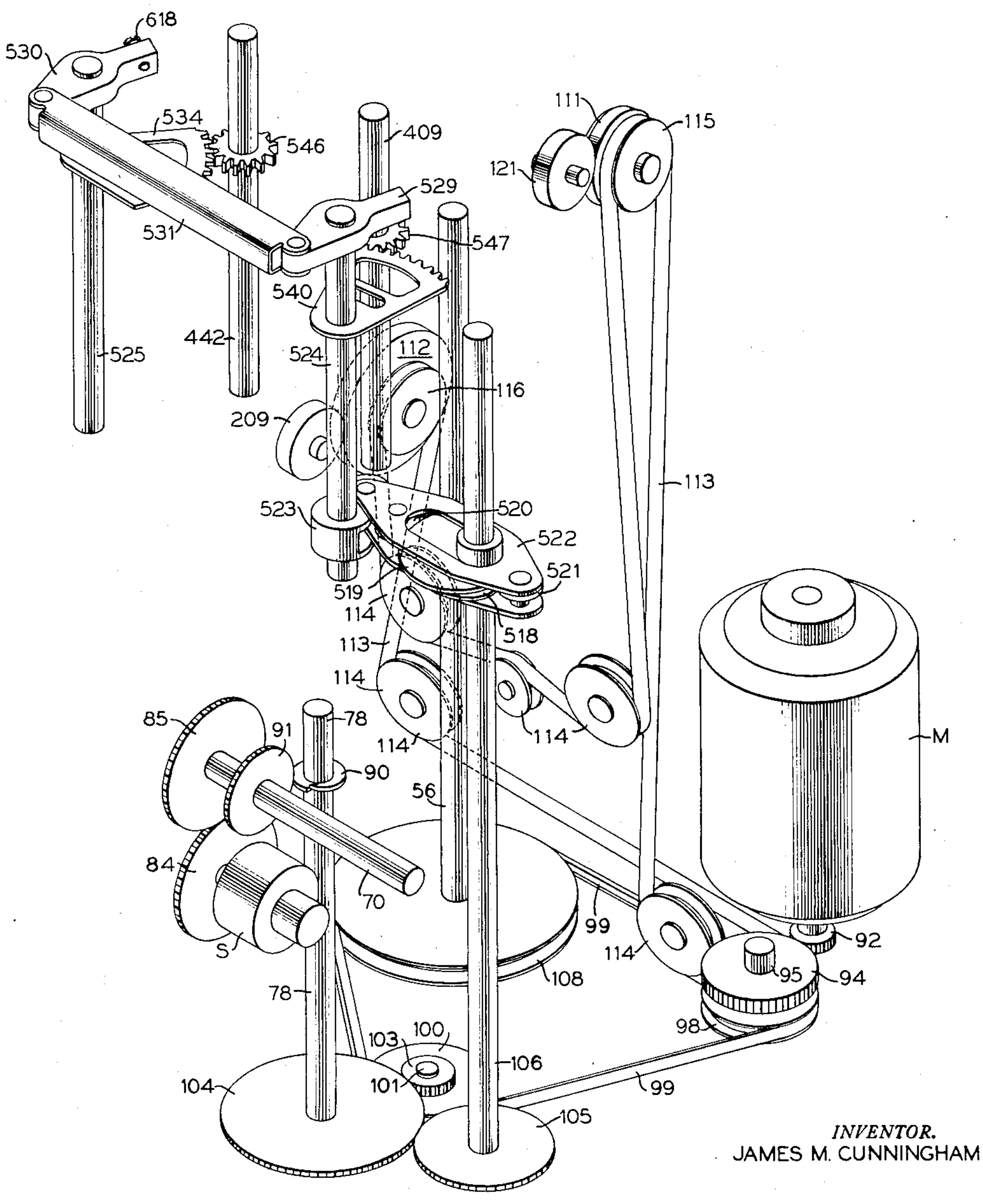
Fig. 5 is an isometric view of the drive shafts and feed roll pulley drive and shows the method of transmitting motion to the sector shafts of the elapsed time computing mechanism.

The card is fed across the recorder and in between the continuously driven eject roll 112 and its associated idle roller 209 (Fig. 5). Referring to Fig. 3, the eject roll 112 is rotatably mounted on an arm 210 which is pivoted to the machine casting through a stud 211. A roller follower 212 rotatable on the arm 210 coacts with a cam 213 fastened on the cross-feed drive shaft 56 which at this time will pivot the eject feed roll 112 against the card and the idle roller 209. The card will be fed downward into a stacker box, indicated generally at 214 in Fig. 2, and as the card enters the stacker box a flipper arm 215 will flip the card forward so that the cards will be in the same sequence as when inserted into the recorder. Referring to Fig. 6, the flipper 215 is pivotally mounted in a fixed bracket 216 and extends through the bifurcated end of a bell crank 217 pivotally mounted on a stationary stud 218. The flipper arm is operated through the bell crank by a cam 219 fastened on the cross-feed shaft 56. A suitable opening is provided in the front cover (not shown) so that the cards may be easily removed from the stacker box.

If a card is positioned in the "Out" slot 18 for an "Out" registration, it will be fed downward as before only this time it will engage a card stop shelf 220 (Fig. 13) which is at a higher level than shelf 123. Shelf 220 is on the other side of the center shield 16 from shelf 123 and correctly positions the card for an "Out" registration. The cross-feeding and ejecting operations will ensue in the same manner as described for an "In" registration.

If a card should be inserted incorrectly, in other words, the corner cut is not in the lower right-hand corner, then the square corner will engage an upper shelf 221, for an "Out" registration, or a lower shelf 222 for an "In" registration, of a link 223 (Fig. 13). Link 223 is slideably located on the aligner guide 122 through slot 224 and a stud 225 fastened on said guide and is normally biased in an upward position by a spring 226.

The lower end of the link 223 rides in the slot of a link 227 (Fig. 8) and when pushed down by an incorrectly positioned card the lower end of the link 223 will protrude through the slot sufficiently far to interfere with a bell crank arm 228 pivotally mounted on the rock shaft 136. When the latch link 132 is pivoted clockwise to trip the rock shaft, a stud 229 fastened on the latch link and protruding through a bifurcated portion of bell crank arm 228 will pivot the bell crank arm counterclockwise. The upper end of bell crank arm 228 will now move the link 223 and consequently link 227 toward the left. The other end of link 227 is pivoted on a stud 230 fastened to the latch arm 205 and as a result the latch arm 205 will be pivoted clockwise and the stop dog 170 will be latched clear of all of the teeth on ratchets 146, 147. The incorrectly positioned card will then be fed completely through the recorder without any of the normal recording operations being performed.

*Conventional timekeeping*

The timekeeping instrumentalities, which are positioned across the middle portion of the recorder as shown generally in the bottom portion of Fig. 11, are started into operation by the cam 69 (Fig. 7). Cam 69 is driven by the synchronous motor S and through levers starts the drive motor M as previously described. When the stop lever 80 (Fig. 7) is pivoted about stud 81 on a downward movement of the shaft 60, it will move out of the way of an interlock bell crank 231 (Fig. 8) and permit the bell crank to pivot about a stud 232 under the influence of a spring 233 fastened between a fixed bracket 234 and a drive member 235 pivoted to said bell crank 231.

The counterclockwise movement of bell crank 231 allows a latch ear thereon to clear the noses of a dog carrier arm 236, fixed on the minute shaft 78, and a dog 237 pivoted on the dog carrier arm 236. A spring 238 fastened between the dog carrier arm and the dog forces the dog into engagement with a ratchet sleeve 239 fastened to the continuously running gear 104 and as a result the drive is transmitted to the minute shaft 78. During the rotation of minute shaft 78 a stud 240, fastened on an interlock disc 241 which is fast on the minute shaft, will cam an extension 242 of the bell crank 231 to restore the bell crank so that the dog 237 and dog carrier arm 236 will be latched up at the end of one revolution. A detent arm 243 pivoted on stud 232 and under the influence of a spring 244 mounted in bracket 234 serves to detent the dog 237 in its latched position. The minute shaft 78 will make one revolution every minute taking only a fraction of a minute to complete its cycle.

The time, day and months wheels, shown generally at the bottom of Fig. 11, are driven by two means, one a Geneva drive and the other a ratchet drive. The conventional time is kept on seven separate gear wheels with each gear wheel having an associated type wheel. The seven wheels keep time as follows: units of minutes, tens of minutes, hours, AM–PM, units of days, tens of days and months.

The units of minutes gear wheel 245 (Figs. 11 and 18) is geneva driven and it drives the tens of minutes gear wheel 246 also with a Geneva motion. The hour gear wheel 247, AM–PM gear wheel 248, units of days gear wheel 249 and tens of days gear wheel 250 are ratchet driven while the tens of days gear wheel 250 drives the month gear wheel 251 with a Geneva motion.

As will be understood the units of minutes gear wheel has ten teeth and makes one revolution every ten minutes, the tens of minutes gear wheel has twelve teeth and makes one-half revolution every hour, the hour gear wheel has twelve teeth and is advanced two revolutions each day. The units of days gear wheel has ten teeth and makes three revolutions each month and the tens of days gear wheel has ten teeth and makes one-half revolution each month.

The minute drive shaft 78 (Fig. 11) has fastened to it a Geneva drive disc 252 which has a drive pin 253 secured thereon. The drive pin 253 drives a five slot Geneva disc 254 secured to a sleeve 255 which is rotatable on a stud (not shown). Fastened to the other end of sleeve 255 is a gear 256 which meshes with and drives a gear 257 fast on a shaft 258. A gear 259, also fastened to shaft 258, meshes with and drives a type wheel gear 260 to which units of minutes type wheel 261 is attached. The type wheel gear 260 also meshes with and drives the units of minutes gear 245 rotatably supporting the six other gear wheels 246 through 251.

Referring to Fig. 17, there is shown a detail of the drive from the units of minutes gear wheel 245 through the tens of minutes gear wheel 246 to the ratchet wheel 263 which feeds the hour gear wheel 247. A drive stud 264 attached to a tooth on the units of minutes gear wheel 245 engages with a Geneva disc and gear assembly 265, rotatable on a stud 266, and the Geneva disc assembly 265 in turn engages and drives the tens of units gear wheel 246 advancing it one tooth for every revolution of the units of minutes gear wheel 245. The six other timekeeping gear wheels on the shaft 262 all drive an associated type wheel such as the month type wheel 266*a* loose on a shaft 266*b* (Fig. 16), which shaft also supports the previously mentioned units of minutes type wheel gear 260 and type wheel 261.

The ratchet feed previously mentioned is initiated by a cam 267 (Fig. 16), securely held on the minute shaft 78, coacting with a roller follower arm 268 fastened on a sleeve 269 which pivots with a minute rock shaft 270. An arm 271 is also secured to the sleeve 269 and on every revolution of cam 267 the follower arm 268 and arm 271 will be pivoted in a clockwise direction with shaft 270. A spring 271*a* fastened between arm 271 and the casting serves to bias the follower arm against the cam. Attached to the follower arm 268 is a link 272 and cooperating with a stud 273 on arm 271 is a slotted link 274. The link 272 will always complete the stroke set by follower arm 268, whereas the slotted link 274 may at times not complete the return stroke of arm 271. This condition exists when a month indicating bail 275, pivoted about a fixed stud 276, engages the projection 274*a* on link 274. As will be later described, under this condition link 274 will make only a short stroke, whereas when the month indicating bail 275 is not engaged with projection 274*a* link 274 can make a long stroke. The link 272 is connected to a dog carrier plate 277 and pivots it about the gear wheel shaft 262 and the slotted link 274 is connected to a double dog carrier plate 278 and pivots it about the shaft 262.

The hour, AM–PM units of days and tens of days wheels are all ratchet fed and are controlled by cams attached to the preceding wheel or wheels in the following manner:

A cam slot 279 in cam 280 (Fig. 17) attached to the units of minutes wheel 245 and either of two slots 281 in a cam 282 attached to the tens of minutes wheel 246 will line up once every hour at which time a cam follower 283, pivoted on fixed stud 284, will be permitted to drop into the cam slots. When the cam follower 283 rests on the high surface of either of the cams a leg of said cam follower will engage a lip of an hour ratchet dog 285, pivoted on a stud 286 on the dog carrier plate 277, and prevents the dog 285 from feeding the hour ratchet wheel 263 and hour gear wheel 247 attached thereto. When the cam follower 283 seats in the cam slots the hour ratchet dog 285 is free to pivot into engagement with the hour ratchet wheel 263, under the influence of a spring 287, and therefore the hour wheel 247 can be advanced when dog carrier plate 277 is reciprocated by link 272 (Fig. 16).

The hour wheel 247 has attached thereto a cam 288 (Figs. 18 and 19) having a cam slot which operates a cam follower member 289 pivoted through a sleeve 290 to the stud 286 which is fixed on the dog carrier plate 277. Fastened to the cam follower member 289 and having a similar shape is an AM–PM ratchet dog 291. The cam follower-ratchet dog assembly is urged in a counterclockwise direction by a spring 292 so that the tooth on the cam follower will ride on the periphery of cam 288. The cam follower tooth will enter the slot in cam 288 when a change from AM to PM is required, at which time the tooth on ratchet dog 291 will engage a ratchet wheel 293 attached to the AM–PM gear wheel 248. The AM–PM gear wheel will then be advanced when the dog carrier plate 277 is actuated.

In the case of the hour feed and the AM–PM feed, the immediately preceding wheel and associated cam slot position is the deciding factor in whether a wheel will be advanced or not. The controlling means for this action are formed lips projecting from each cam follower arm to the cam follower arm preceding it. As shown in Figs. 18 and 19, a formed lip 294 on the hour cam follower arm 289 extends between the units of minutes cam follower arm 283 and the hour ratchet dog 285. Thus, it can be seen that although the slot in hour cam 288 would perhaps permit an advance of the AM–PM gear wheel 248, if the units of minutes cam follower arm 283 is on the high surface of cams 280, 282, hour ratchet dog 285 will prevent the cam follower arm 289 from pivoting into its cam slot. As a result of such construction, the wheel advances will be made simultaneously when the units of minutes advance is made.

The time advance stroke, as initiated by cam 267 (Fig. 16), occurs slightly later than the Geneva drive advance of the units of minutes and tens of minutes wheels. If an advance of the hour or AM–PM wheels is required, the cam slots of these ratchet fed wheels will have been in position since the last previous advance, but they have been prevented from engaging a tooth by the lower order units of minutes cam follower arm not being positioned properly. The Geneva drive to the units of minutes and tens of minutes wheels is sufficiently far ahead to permit the cam followers to drop into their respective cam slots, if such be the case, before the ratchet feed takes place during the same cycle.

The units of minutes, tens of minutes, hour and AM–PM wheels are all regular in their advancing and no problems arise. However, the units of days and tens of days wheels must be operated for 30 day and 31 day months. As was previously mentioned, a month indicating bail 275 (Fig. 16) controls the length of movement of the link 274 which in turn actuates the double dog carrier plate 278. A follower arm 295, integral with said month indicating bail, coacts with a cam 296 fastened to the month gear wheel 251. The five lobes on cam 296 represent the five months of the year having 30 days or less (February, April, June, September and November) and for each of these months the bail is pivoted clear of the projection 274*a* and link 274 will make a long stroke toward the left. When the cam follower arm 295 engages the recessed portion of cam 296, the ear on bail 275 will be permitted to get in front of projection 274*a* and link 274 will, as a result, make a shorter stroke to the left.

Referring to Fig. 19, a cam 297 fastened to the AM-PM gear wheel 248 coacts with a cam follower arm 298 pivoted on the stud 286. The cam follower arm 298 is on the low portion of cam 297 during PM time and on the high portion during AM time. When the cam follower 298, under the influence of a spring 299, rests on the high portion of cam 297, the top extended portion of said follower will strike against an ear 300 (Fig. 20) of a double pawl assembly 301, pivoted on a stud 302 fastened on the carrier plate 278. In such position, cam follower 298 prevents the double pawl assembly from pivoting counterclockwise, under the force of a spring 303, and thereby prevents a feed of either the units of days wheel 249 or the tens of days wheel 250. During PM time the cam follower 298 is normally prevented from engaging in the recesses in cam 297 by the previously mentioned formed lip projections on the cam follower arms. The formed lip projection 304 on the cam follower arm 298 is against the edge 305 of the ratchet dog 291 except during the advancement of the units of minutes gear wheel at which time the cam follower arm 298 will be free to engage in the recesses in cam 297.

The position of the double pawl assembly 301, as will be seen, is governed by the AM-PM cam follower arm 298, the surface 277*a* of dog carrier plate 277, a high blank tooth 206 on a ratchet wheel 307 attached to the tens of days wheel 250 (Fig. 20) which coacts with a cam lever CL, and the deep tooth 308 on a ratchet wheel 309 fastened to the units of days wheel 249.

A feed in the units of days wheel must occur once a day; namely, when changing from 11:59 PM to 12:00 AM. The relationship of movement between the dog carrier plate 277 and the double pawl carrier plate 278 is such that the double pawl assembly 301 will ride on the straight portion of surface 277*a* of the dog carrier plate during part of the movement of the two carrier plates 277 and 278.

The tens of days ratchet wheel 307 is constructed with teeth of three different radial dimensions for reasons which will be presently described. The two blank teeth 306 have the largest radial dimension, the two teeth 310, representing numeral 3, have the next largest radial dimension and the remaining six teeth 311, representing the numerals 1, 2, and 3, have the smallest radial dimension.

The units of days wheel is advanced one position every day except when changing from 31 to 01, in which cases it does not move. The tens of days wheel is advanced one position every ten days and when changing from 31 to 01. When changing from 30 to 01 it is advanced two positions.

Several examples will now be described to clarify the above operations. On a long stroke, the straight portion of surface 277*a* prevents the double pawl assembly 301 from engaging any teeth except the high teeth 306. When the bent out portion of surface 277*a* is reached, the pawl 301*a* is permitted to engage a tooth on the units of days ratchet wheel 309. The only deep tooth on this wheel is the "0" tooth 308 and only when the pawl 301*a* is in this tooth is the travel sufficient for pawl 301*b* to engage a tooth on the tens of days ratchet wheel 307 other than the high teeth 306 and 310. On a short stroke the double pawl 301 does not return far enough to engage any other tooth than the one required and there is no necessity for the surface 277*a* of the dog carrier plate 277. It will be understood that the motion will be uniform until the 30th day has been reached, as all advancements, both on a short and long stroke, are normal.

As previously described, a 31 day month requires a short stroke. In changing from 30 to 31 days the feeding of the units of days ratchet wheel 309 by the pawl 301*a* is normal but the tens of days ratchet wheel 307 is also fed one position to the tooth 310 position by virtue of the larger radial dimension of teeth 310. In changing from 31 to 01 no feed is required in the units of days wheel but a feed will be made in the tens of days wheel. The large blank teeth on the tens of days ratchet wheel 307 limit the pivoting of the double pawl assembly 301 by means of the cam lever CL which is pivoted on a stationary stud. The cam lever is urged to ride the surface of the tens ratchet by a spring 311*a* and when changing from 31 to 01, the large blank tooth 306 will be in position to cam the lever radially outward. The cam lever coacts with an ear 301*c* on the pawl assembly and, when cammed outward by either of the teeth 306, the cam lever will hold pawl 301*a* clear of the teeth on the units ratchet but still allow the pawl 301*b* to catch the blank teeth on the tens ratchet. Consequently, the tens ratchet will feed one position while the units ratchet remains stationary.

On a long stroke or 30 day month the requirement is to change from 30 to 01. The tens of days ratchet wheel 309 will be on the first 3, as shown in Fig. 20, and therefore a two space feed is required to reach the blank position. It is to be noted that only a one space feed is required in the units of days ratchet wheel 307. The large blank tooth 306 and cam lever CL are again active and prevent the double pawl assembly 301 from pivoting far enough to engage a tooth on the units of days wheel 309, while pawl 301*b* engages the blank tooth 306 to advance the tens ratchet two positions by virtue of the long stroke. As shown in Fig. 20, an overrunning pawl 312 is pivoted on the tens of days ratchet wheel 307 and cooperates with a toothed disc 313 fastened to the units of days ratchet wheel 309. The relationship between the pawl 312 and the teeth 314 on disc 313 is such that they will coact on a long stroke when changing from 30 to 01 and thus the units of days wheel 309 is advanced one position while the tens of days wheel 307 is advanced two positions. At the end of the two position advance the blank tooth 306 is opposite a notch in the end of the cam lever and the lever is now allowed to move radially inward so that pawl 301*a* can advance the units ratchet when changing from 01 to 02.

A disc 315, fastened to the tens of days ratchet wheel 307, has two camming studs 316 which drive a Geneva gear 317 rotatable on the fixed stud 266. Referring to Fig. 16, the Geneva gear 317 has fastened thereto a gear 318 which in turn drives the month gear wheel 251.

The dial mechanism indicated at D on Fig. 1 is driven from the minute shaft 78 by a gear 319 (Fig. 16) which meshes with a gear 320 (Fig. 2) fastened on a stud 321 journaled in bracket member 322. Fastened to gear 320 is a gear 323 which meshes with and drives a gear 324 fastened on a stud 325 journaled in bracket member 322. Secured to the gear 324 is a pinion 326 which meshes with and drives a large gear 327 rotatable on a fixed stud 328 on frame member 329.

The gear 327 drives a gear 330 rotatable on a fixed stud 331 and fastened to the gear 330 is a units of minutes dial wheel 322 which is advanced one position every time the minute shaft 78 makes a revolution.

A cam disc 333 fastened to the units of minutes dial wheel drives a Geneva gear 334, rotatable on a fixed stud 335, and fastened to the Geneva gear 334 and driven thereby is a tens of minutes dial wheel 336.

The Geneva gear 334 also has fastened thereto a cam disc 337 which drives a Geneva gear 338 rotatable on a fixed stud 339. Fastened to the Geneva gear 338 and driven thereby is the hour dial wheel 340.

*Program unit*

The program unit is essential to the correct operation of the recorder in that it controls the advancement of the elapsed time wheels. It is clear that in order to obtain the correct elapsed time between any start and stop operation the elapsed time wheels must be in synchronization with the timekeeping wheels except where certain conditions arise. These conditions may be, for instance, a lunch period, a rest period or a similar out time. Under such a condition, the elapsed time wheels must be stopped for the exact length of the "Out" or non-working period, in order to eliminate this period from accumulating elapsed time.

In addition to the clutching on and off of the elapsed time wheels, the program unit also controls the punching of the checking holes which enable a visual check on the cards to see if they were all inserted in the recorder at the proper time.

The controlling means for the program unit is an endless brass tape T (Figs. 1 and 2) which is wound around a pair of guide plates 341. The tape has a series of feed holes 342 which cooperate with a sprocket wheel 343 attached to the shaft 70. The shaft 70 is driven from the minute shaft 78 at the rate of one revolution per hour through the worm gear 90 and the gear 91. The sprocket wheel 343 in turn advances the tape one revolution in every 12 hours.

Referring to Fig. 30, which shows in detail a portion of the tape, it can be seen that the tape is provided with No. 1 and No. 2 program channels 344. These channels may be prepunched at various time indicating positions to control the start-stop operations of the computing cycle, the edges of the tape being provided with a scale of graduations marked off at minute intervals. The No. 1 program channels are used for a regular day schedule and the No. 2 program channels are used for special days. A pair of No. 1 and No. 2 signal channels 345 are also provided for controlling bell ringing circuits for regular days and special days.

As shown in Figs. 1 and 2, there are provided twelve sensing fingers 346 which sense perforations in the tape in the following manner: One for a regular start, one for a regular stop, one for a special start, one for a special stop, one for regular and one for special bell circuits. The afore-mentioned are duplicated both in AM and PM positions and are mounted in a cage 347. The cage 347 is pivoted on a stud 348 (Fig. 23) fastened to a bracket plate 349 and the cage is rocked about this stud by a connecting rod 350. As shown in the lower right-hand portion of Fig. 11, the other end of the connecting rod 350 is fastened to a lever arm 351 pivoted on the minute rock shaft 270. An extension 353 of the lever arm is disposed for coaction with a camming pin 354 fastened to the Geneva drive disc 252 on the minute shaft 78, said camming pin 354 initiating a rocking action once each minute during the rotation of the minute shaft.

Referring again to Fig. 23, the sensing fingers 346 are spring loaded by springs 355 and in rocking the fingers back and forth against the tape, they are either held back by said tape or are permitted to protrude through it in those positions where there may be a hole. When a sensing finger is permitted to protrude through the tape it will be in the normal path of either bail 355 or bail 356. Bail 355 has two projecting lips **355*a* which are in alignment with the stop channels 3, 4, 7 and 8 of the tape and the bail 356 has two projecting lips 356*a*** which are in alignment with the start channels 1, 2, 5 and 6.

Bails 355 and 356 are pivotally mounted on shafts 357 and 358, respectively, said shafts being mounted in a carrier frame 359. The carrier frame 359 is pivoted on a stationary shaft 360 and is rocked about this shaft through a link 361 and a connecting rod 362 which are fastened together. The other end of the connecting rod 362 (Fig. 11) is fastened to a bent lever arm 363 pivoted on the shaft 270. The end of lever arm 363 is disposed in the path of a downwardly extending camming pin (not shown), which is fastened to a cam 364 on the minute shaft 78.

The sequence of operation of the carrier frame 359, sensing fingers 346 and the tape T is as follows: The carrier frame 359 is rocked up and the sensing fingers are backed out of engagement with the tape. The tape is then advanced after which the sensing fingers are brought in against the tape and the carrier frame 359 is rocked back down.

The bails 355 and 356 are positioned so as to coact with the sensing fingers as required by the holes in the program tape. If a finger finds a hole and protrudes through the tape, it may engage under a lip on either bail 355 or 356, depending on the particular finger involved. If a finger protrudes in a position where bail 355 is active then, when the carrier frame 359 is rocked down, bail 355 will coact with said finger and be pivoted clockwise about the shaft 357. The other end of the bail will now coact with a U-shaped rock lever 365, having a pair of side arms 366 pivoted on a fixed stud 367, and will pivot the rock lever counterclockwise to the position shown in Fig. 23. The pivoting of the rock lever 365 is with a snap action due to the coaction between an arm 368, attached to the rock lever, and a detent spring blade 369 mounted on casting member 370.

If, on the other hand, a finger protrudes in a position where it may coact with bail 356, then, upon the rocking motion of carrier frame 359, the bail 356 will be pivoted clockwise. The other end of bail 356 will engage the rock lever 365 and pivot it clockwise. The detent spring 369 serves to keep the rock lever in one or the other of its two positions.

A link 371 is attached at one end to one of the arm portions 366 of the rock lever by a stud 372, and is fastened at the other end to a bell crank 373 pivotally mounted on a stationary stud 374. The rocking motion of the rock lever is thereby transmitted to the bell crank 373 and the bell crank controls a special punching operating pitman **373*a*** to effect punching the checking holes in the card.

Also pivoted on the stud 372 is a link 375 which is connected to a stud 376 on a vertical link 377. The bifurcated end of link 377 is mounted on a stationary stud 378 and, through link 375, the link 377 is moved vertically up and down. The upper end of link 377 extends through a slot in a bell crank arm 379 (see also Fig. 26) secured on the minute rock shaft 270. At the upper limit of its travel, the end of the link extends along the edge of an arm 380, loose on the rock shaft 270, and serves to move the arm 380 in synchronism with the movement of bell crank arm 379. Such action will initiate an advancement of the elapsed time wheels once every minute in a manner to be described.

Referring to Fig. 2, the controlling means for a special day and a regular day as well as for AM and PM is a shield 281 which extends between the sensing fingers 346 and the program tape T. Numbering the sensing fingers 1 through 12 from left to right, the shield has openings opposite fingers 1, 3 and 9 on one line and 5, 7 and 11 on another line. The first line represents regular day operation and the other line special days. The shield is pivoted on a stud 382, fastened to a follower arm 383, and is moved about this stud to bring either of the two lines of holes into operative alignment, with the ends of the sensing fingers. The shield also has a slot at the top which rides on a stud 384, fastened to a second follower arm 385, thus enabling the shield to be moved left or right by the stud 382 to give AM or PM operation.

Positions 1, 3 and 9 of the sensing fingers represent AM regular and by shifting the shield to the right, positions 2, 4 and 10 become operative and are PM regular. By shifting the shield upward, positions 6, 8 and 12 are in an operative position and represent PM special and then a shift to the left will make the 5, 7 and 11 positions operative to represent AM special.

A cam 386, attached to the hour wheel 340 of the dial mechanism, coacts with a bell crank arm 387 pivoted on a stationary stud 388. The other end of the bell crank arm 387 is bifurcated and rides on a stud 389 fastened to an arm 390. The arm 390 is pivoted on a stationary stud 391 and carries a drive pawl 392 which is spring biased around stud 389 by a spring 393. Counterclockwise movement of the bell crank arm 387 will cause the pawl 392 to engage and advance a ratchet wheel 394 loose on the stud 391. A spring biased pawl 395 is provided to detent the ratchet wheel, said ratchet wheel having 14 teeth to accommodate 7 days of the week, AM and PM.

Referring to Fig. 24, there is attached to the ratchet wheel 394 a program cam assembly comprising a notched AM–PM cam 396, a slotted day cam 397, integral with cam 396, and a retaining disc 398 fastened over the slotted surface of day cam 397. The seven projections on the cam surface of cam 396 represent PM and control the PM programming while the inner periphery of the cam has seven AM cam surfaces for controlling AM programming. The retaining disc 398 and day cam 397 form seven day representing slots into which insertable slugs, such as shown at 399, may be inserted to control regular or special day programming.

The follower arms 383, 385 (Fig. 2) are both pivotally mounted on the stud 328 and are operated counterclockwise once every minute by a follower bell crank arm 400 (see also Fig. 1), which is pivotally mounted to a support member 401 and actuated by a cam 402 fastened on the minute shaft 78. Projections of the arms 383, 385 ride against the peripheries of cams 396 and 397 respectively under the influence of springs 403 and the counterclockwise camming of these follower arms once each minute by cam 402 serves to free the AM–PM cam 396, day cam 397 and ratchet 394 for advancement by drive pawl 392.

At the completion of each advancement of the AM–PM and day cams the minute shaft cam 402 allows the follower arms 383, 385 to restore in a clockwise direction, however, the position of the AM–PM and day cams will determine the amount of clockwise movement of the arms and also the position of the shield. If follower arm 383 strikes one of the PM projections then the shield will be positioned to the right to allow either the 2, 4, and 10 or 6, 8 and 11 sensing positions to be operative or if it strikes one of the AM cam surfaces it will be positioned to the left to allow either the 1, 3 and 9 or 2, 4 and 10 sensing positions to be operative. Concurrently, if the follower arm 385 strikes an insertable slug then the shield will be positioned upward to bring the bottom line of perforations into operative position for a special day. If follower arm 385 finds no slug the shield will be positioned downward for regular day operation. As an example, if initiation of a program is required in the morning of a special day, the shield will be positioned upward and to the left making sensing positions 5, 7 and 11 operative and allowing sensing fingers to search channels 5, 7 and 11 on the tape for either a start, stop or signal perforation.

*Elapsed time drive*

The drive to the elapsed time wheels is initiated from the arms 379 and 380 on the minute rock shaft 270 (Fig. 26), which is rocked once each minute as previously described. It will be remembered that link 377 is moved up and down by the program mechanism, depending upon the perforations in the program tape, and this link controls the regular advancement of the elapsed time wheels during regular working periods and also prevents the advancement of the elapsed time wheels during irregular or non-working periods. The program bails 355, 356 (Fig. 23) are arranged so that any perforations in the start channels 1, 2, 5 and 6 of the tape will operate the program mechanism to move link 377 upward and, conversely, any perforations in the stop channels 3, 4, 7 and 8 will effect a downward movement of the link 377.

Referring to Figs. 25 and 26, there is shown a pair of actuating links 404, 405 pivoted to studs 406, 407 attached to the arm 380. The opposite end of link 404 is pivoted to a pawl carrier plate 408 which is free on a shaft 409 journaled in support member 410. The end of the other link 405 is pivoted to a dog carrier frame comprising the two plates 411 free on shaft 409 and joined together by posts 412. The dog carrier plate 408 carries a pawl 413 pivoted on a stud 414 and biased, by a spring 415, towards a hundredths of hours ratchet 416 fixed on the shaft 409. The ratchet 416 is connected, through a sleeve 417, to a hundredths of hours drive gear 418 and cam 418a positioned within the carrier frame and fast on the shaft 409.

Pivoted on one of the posts 412 are three more pawls 419 which are all biased by springs 420 toward three individual wheel assemblies free on shaft 409 and representing tens of hours, units of hours and tenths of hours. The tens of hours assembly comprises a drive gear 421 and ratchet 422 fastened together as a unit. In like manner, the units of hours assembly comprises drive gear 424, ratchet 425 and cam 426; and the tenths of hours assembly comprises drive gear 427, ratchet 428 and cam 429.

It can be understood that when link 377 is in its upward position as the result of a start program, the bell crank arm 379 can drive arm 380 clockwise and links 404, 405 will cause the pawls to engage and advance the gear wheel assemblies. The gear wheel assemblies in turn mesh with and drive the elapsed time type wheels 430 free on a shaft 431.

If the link 377 is in its downward position as the result of a stop program, bell crank arm 379 will merely pivot around underneath arm 380, with guide stud 432 free to move in a slot in arm 380, and there will be no advancement of the elapsed time type wheels.

It is to be noted here that the rocking action of shaft 270 occurs every minute, yet both the conventional and elapsed time type wheels are graduated in hundredths of hours. To take care of this condition a special schedule has been adopted which takes the following pattern:

| Minutes | Decimals |
|---|---|
| 00 | .00 |
| 01 | .02 |
| 02 | .03 |
| 03 | .05 |
| 04 | .07 |
| 05 | .08 |
| 06 | .10 |
| 07 | .12 |
| 08 | .13 |
| 09 | .15 |
| 10 | .17 |
| 11 | .18 |
| 12 | .20 |

The hundredths of hours ratchet 416 is designed as a ten tooth ratchet but has teeth corresponding to the 1, 4, 6 and 9 positions removed to comply with the schedule shown above. The carrier plate 408 is rocked through an arc large enough to permit the hundredths position pawl to advance the hundredths of hours ratchet two spaces when so required. The length of the stroke of the pawl is always the same and the actual rotation imparted to the hundredths of hours wheel assembly depends on where the pawl engages a tooth on the hundredths ratchet. If the pawl should drop in, say between teeth 2 and 3, it will almost immediately engage a tooth and advance the wheel assembly two spaces before it reaches its limit of travel. If the pawl should drop in, say between teeth 3 and 5, it merely rides idle until near the middle of the stroke when it engages a tooth and has only sufficient travel left to advance the wheel assembly one tooth.

The other three ratchets attached to the tenths, units and tens of hours wheel assemblies are all conventional ten tooth ratchets which are advanced one space at a time by their respective pawls. The tens, tenths and units cams, which all take the same shape as the hundredths cam 418$a$, are provided to control the four drive pawls through a system of crossover extensions similar to those used for the conventional time wheels. Each of the three pawls 419 has an extension, such as indicated at 433 on the hundredths pawl, and any pawl riding on the high surface of the cam attached to the next lower order wheel assembly will prevent a feed of its own wheel assembly and because of the crossover extensions will prevent a feed of all of the higher order wheels assemblies.

An aligner bail 434 is provided for normally detenting the type wheels 430 into alignment. The bail is pivoted on a stationary stud 435 and, through a roller follower 436 and a cam 437 fast on the minute shaft 78, the bail is pivoted away from the type wheels once each minute to free them for advancement. There is also a cam 438, fast on the computing shaft 106, which coacts with roller follower 439 to pivot the bail away from the type wheels when it becomes necessary to back the type wheels up during the computing cycle.

A stationary pin 440 is provided in the mechanism which normally lifts all of the pawls clear of the ratchets. The reason for this is that the pawls must be clear of the ratchets during the computing cycle when the wheel assemblies are backed up.

*Coding and punching elapsed time position punching*

The coding of the elapsed time punchings 34 and 37 (Fig. 34) for "In" and "Out" registrations is shown in Fig. 35 as a four element code comprising elements A, B, C and D. Fig. 36 shows the pattern of code punching positions on the card for a single registration, either "In" or "Out," this pattern being duplicated for all the 20 possible registrations shown on the card. The example shown in Fig. 36 shows a code punching for a time registration of 06:47.

The coding of the elapsed time is accomplished by four groups of four cams 441 each (Fig. 25), each group being associated with one of the four possible registration digits. Each of the cams 441 are secured to each other into these groups of four and in the case of the hundredths and tenths digits the associated groups of cams are fastened to the shafts 409 and 442 respectively. The hundredths cam unit is directly driven then through shaft 409 and the hundredths wheel assembly. The tenths cam unit is driven through the shaft 442 and a gear 443 secured on said shaft and in mesh with the tenths type wheel.

The tens cam unit is fastened to a pinion 444, which is rotatable on the shaft 409, and both are driven through a sleeve 445 connected to the tens gear wheel 421. The units cam unit is also fastened to a pinion 446, rotatable on the shaft 442, and both are driven through a sleeve 447 connected to a gear 448. The gear 448 is loose on the shaft 442 and meshes with the units type wheel. The gear pinion 443, pinion 443$a$, tenths cams, tenths type wheel, and gear 427 always maintain the same relation with each other. Similarly, gear 448, pinion 446, units cams, units type wheel and gear 424 always keep the same relation to one another.

Referring to Fig. 22, the cams 441 cooperate with eight pairs of punch interposers 449, 450 and position them in either an operating or a non-operating position. The sixteen interposers are pivoted on a shaft 451, fastened in a punch operating arm 452, and are guided in slots of a comb block 453 (see also Fig. 29). The punch interposers are held against the cams 441 by springs 454 which are contained within the punch operating arm 452.

The punch operating arm 452 is pivotally supported at 455 and has roller followers 456 and 457 which cooperate with a cam 458 secured on the computing shaft 106. Cam 458 initiates the punching operation in the computing cycle during which cycle the card is at rest. The leading edge of a notch 459, formed in each interposer, serves as a retracting or stripping member for a punch 460 associated with each interposer. The trailing edges of the notches 459 serve as a positive drive for the punches. If a cam 441 has positioned interposer 449 in a central position, as shown in Fig. 22, the trailing edge of notch 459 will actuate a punch 460 when cam 458 pivots the punch actuating arm clockwise. When the bump on cam 458 strikes roller 456, the punch actuating arm and the leading edge of notch 459 will operate to retract the punch from the card and from the die and stripper assembly 461. If a cam does not require a punch to be operated, the trailing edge of the notch in the related interposer will miss the punch. All of the interposers are actuated at punching time and only the cams 441 determine the proper punching.

As was previously mentioned, a positioning hole is punched on every insertion of the card and a checking hole is punched at every regular time operation. For punching these holes there are provided the two punches 462 and 463 (Fig. 29) each having a notched portion for receiving a related interposer 464 and 465. The punch interposer 464 is pivoted on the shaft 451 and operates punch 462 to punch a positioning hole every time the punch actuating arm 452 is actuated. Interposed 465 is pivoted to the interposer 464 through a stud 466 and is operated from the program unit (as previously mentioned) through an arm 467, pivoted to the rock shaft 136, and suitably connected to the punch operating pitman 373$a$ (Figs. 11 and 23). The pitman 373$a$ is connected to the program unit bell crank 373 through sleeve 373$b$ and as a result the punch 463 will punch a checking hole in the card for every regular time operation as determined by the program unit.

As shown in Figs. 3 and 4, a delivery tube 468 is provided to carry the punchings to a suitable chip box 469.

*Sensing the code holes*

As was previously mentioned, one of the functions of the recorder is to punch the setting of the elapsed time wheels on an "In" registration and on an "Out" registration. The "In" registration punchings are sensed to compute the elapsed time between a present "Out" registration and a previous associated "In" registration and the result is subtracted from the present setting of the elapsed time wheels.

The sensing mechanism is a separate assembly and is shown in Fig. 12. The unit is air operated from a cylinder 470 and piston 471 supported on casting member 472 and located in the top rear portion of the recorder. The piston 471 produces the required blast of air for sensing and is blasted between the cylinder and a support bracket 473 by a coil spring 474. The end of piston rod 475 is fastened to a follower arm 476 pivoted on a stationary stud 477 and carrying a roller follower 478 and a formed ear 479. The roller follower 478 and ear 479 coact with a cam 480, secured to the computing shaft 106 and, since the blast of air required for sensing can best be obtained from a quick or sudden drop off of the follower arm 476, the air blast is initiated by the dropping off of ear 479 from the high portion of the cam. The roller 478 serves to bring the cam follower arm 476 into its active position and only transfers its action to the ear 479 just before drop off time.

In general the operation of the sensing unit is as follows: After a card is inserted and the coded punched information is brought into registration with the sensing station 481 (Fig. 13), a blast of air, which is forced through a hole in the card, will actuate plungers which in turn will condition pawls which are then used to stop racks for the computation of the elapsed time.

In Fig. 12 there is shown the restored position of the pawls, such as 482, of which there are 16 spaced alternately in two rows. A pair of restoring bars 483, 484 are horizontally slideably mounted between a pair of slide plates 485 and operate within slots 486, 487 respectively in two end plates 488.

Slideably mounted to each side plate 485 is a slide link 489 having a stud 490 fastened thereto which operates in a slot 491 in end plate 488 and a slot 492 in slide plate 485. The slide plates 485 and slide links 489 are operated by a pair of cam follower arms 493 each one of which is fastened to one of the slide plates 485 by a stud 494. The follower arms 493 are urged by springs 495 to coact with a pair of cams 496 secured to the computing shaft 106. When the follower arms 493 are pivoted clockwise by cams 496, plates 485 are moved upward with the studs 494 moving through slots 497 in the slide links 489. The first portion of the upward movement results in the restoring bars 483, 484 moving away from the pawls 482 and the sliding links remaining in position, due to springs 498, to keep the subtraction racks 499 out of engagement with the pawls 482. The subtraction racks 499, which will be fully described later, are pivoted at 500 and urged clockwise by springs 501 which maintain the racks against a pair of rods 502, 503, mounted in the slide links 489. With the restoring bars 483, 484 moved upward, it is now possible for the pawls 482 to be unlatched as dictated by the code hole punchings in the card.

The air cylinder 470 contains a movable pressure block 504 having 16 air passages 505 and when the piston moves to the left the pressure block will move down against the card and provides a good seal between the card and a stationary block 506 of the sensing unit. If holes are present in the card, the blast of air will impact against plungers 507 of which there are 16 slideably mounted in the block 506. The plungers operate pitmans 508 which are connected to the pawls 482. The pawls 482 are slideable on stationary studs 509 and are further supported by springs 510 fastened to rods 511 secured between the end plates 488. The pawls corresponding to code holes present in the card will be rocked counterclockwise by the pitmans using the loop on each spring 510 as a pivot point. This action is only very slight as after the initial movement springs 510 will take effect and further pivot the pawls 482 about the pitmans 508.

After the pawls have been tripped counterclockwise, cam follower arm 493 moves further to allow the 502, 503 to move upward in slide links 489 due to studs 494 coacting with the upper ends of slots 512 in said links. These rods will now release the racks 499 for engagement with the pawls that were not tripped and they will also move into position at the top of their travel to lock the untripped pawls against any accidental tripping.

After the required pawls have been tripped and the actual subtraction operation completed, as will be described, the cam follower arm 493 operates to return the slide plates 485 downward to their home position. The restoring bars 483, 484 will restore all of the tripped pawls clockwise and studs 494 will restore the slide links 489 downward allowing the rods 502, 503 to cam the racks 499 clear of the pawls 482.

Pawls 482 are latched on square bars 513 fastened between the end plates 488 and are separated from each other and confined in their lateral movement by 17 guide plates 514. The spacing between the guide plates is governed by slots in two end plates separating shafts 515 and 516 and slots in the square bars 513.

*Computing cycle*

As was previously mentioned, the elapsed time computation is accomplished by reversing or backing up the elapsed time wheels an amount equal to the setting of these wheels at the beginning of the period and the pawls 482, which combine to decode the punched holes, engage the subtraction racks 499 to control the backing up of the elapsed time wheels.

Referring to Fig. 11, there are shown the racks 499 of which there is one for each of the sixteen pawls 482. The racks are appropriately spaced in two rows, each row having two sets of four racks each making a total of four sets to correspond to the four orders of the elapsed time wheels. The four racks in each set are riveted together at their pivot end 500 (Fig. 21) and at their opposite end 517. Each set of racks is notched in code, as shown by the two sets in Fig. 37, to correspond to the punching code shown in Fig. 35. Since the four racks in each set are riveted together, each set can only be stopped at one point as determined by the coded punching.

The drive for the subtraction rack mechanism is initiated from a pair of complementary cams 518, 519 (Figs. 5 and 11) fastened on the computing shaft 106. The cams coact with roller followers 520, 521 mounted on a double follower link 522 and serve to oscillate said link back and forth on the computing shaft. The double link 522 is fastened to a double arm 523 secured to a shaft 524, suitably journaled in the machine, and shaft 524 is therefore oscillated by follower link 522.

The oscillating drive is transmitted from shaft 524 to a similar shaft 525 by means of a pair of drive arms 526, 527 (Figs. 11 and 28) secured to the bottom of shafts 524, 525 respectively and joined by a link 528. At the upper ends of the shafts 524 and 525 are secured arms 529, 530 (Fig. 5) and these arms are also joined by a link 531.

Positioned just below the arms 529, 530 is another set of drive arms 532, 533 (Fig. 27) secured to the shafts 524 and 525 and the arms 526, 527, 532 and 533 serve to drive four sector gears. Referring to Fig. 11, a tenths sector gear 534 is pivoted on a sleeve 535, free on the shaft 525, and is positioned directly underneath its related drive arm 533. In a similar manner, a units sector gear 536 and tens sector gear 537 are pivoted on sleeves 538, 539 free on the shafts 525, 524 and are positioned directly above their related drive arms 527, 526. A hundredths sector gear 540 is fastened directly to a hub portion 541*a* of a sleeve 541 free on the shaft 524. Each of the four drive arms has a collar, such as is indicated at 542 on the drive arms 532 and 533 shown in Fig. 27, to which is attached one end of a flat coil spring 543. The other ends of the four springs 543 are fastened to studs 544 on the associated sector gears. The initial tension in the springs 543 insures that the sector gears are at all times coacting with adjusting screws 545 on the drive arms when the sector gears are in the home position.

When the drive arms 526, 527, 532 and 533 are driven counterclockwise by the shafts 524, 525, the spring urged sector gears will follow until they are stopped by the racks 499, as will be presently described, in the proper position to represent the punched coding of the elapsed time. The lower sector gears mesh with the pinion gears 444 and 446 (Figs. 25 and 28) and therefore serve to back up the units and tens type wheels until stopped by the racks 499. The upper sector gears mesh with pinion gears 546 and 547 (Fig. 27) secured to the shafts 442 and 409 respectively and serve to back up the tenths and hundredths type wheels.

Fastened to hub portions 535*a*, 538*a*, 539*a* and 541*a* on each of the sleeves in a drive arm 548 (Fig. 11). A bifurcated end of each drive arm 548 in turn receives the pivot connection 500 of one of the rack sets, as shown in Fig. 21. In the case of the hundredths position it can be seen that as the hundredths gear sector 540 is spring driven counterclockwise its associated drive arm 548, which is directly connected thereto, will move the hundredths rack set toward the left to be stopped by the pawls 482. However, in the case of the tens, units and tenths sector gears there are provided borrow mechanisms, which will be later described, and for this reason the drive to their related rack driving arms 548 is transmitted through pawl carrying plates 549 fastened to the other ends of the hub portions 535*a*, 538*a* and 539*a*. Since the drive from the tens, units and tenths sector gears is similar in each case it will suffice to describe only one of them in detail.

Referring to Fig. 27, the pawl carrying plate 549 for the tenths sector gear 534 has pivoted thereon a drive pawl 550. The drive pawl is normally biased against a raised portion 551 on the sector gear by a spring 552 and in the normal position, as shown, the driving pawl is prevented from engaging a borrow pawl 553 pivoted at 554 to the plate 549. The borrow pawl 553 has a stud 555 which rides in a guide slot in a cam follower arm 556. The cam follower arm 556 has a bifurcated end which normally is biased flush against the sleeve 535 due to the tension exerted on pawl 553 by spring 557.

Now when the tenths gear sector is spring driven counterclockwise the movement of the projecting surface 551 will allow the driving pawl 550 to pivot along a guide stud 558 and into engagement with the tooth on borrow pawl 553. Simultaneously a projection 559 on the sector gear will engage an inclined surface 560 on the driving pawl and the motion of the sector gear will be transmitted by the pawls 550, 553 and plate 549 to the related rack driving arm 548 thus moving the tenths rack set past the stopping pawls 482.

The driving elements from the units and tens sector gears shown in Fig. 28 are identical to those described for the tenths sector gear except that the units and tens cam follower arms 561 and 562 have different shapes to comply with the physical locations of the different wheel assemblies. It will be noted that the pawl carrying plates 549 also act as supports for the sector gears by riding within shouldered studs 572 and 573 (Fig. 27) mounted on the units, tens and tenths sector gears.

The rivet connections 500 of the rack sets are supported and reciprocate in slots 563 (Fig. 21) of a pair of stationary frame members 564. The springs 501, which urge the rack sets up against the pawls and of which there is one for each rack set, are fastened between an extended position 565 of one of the racks in each set and two pairs of slide links 566, 567. These slide links are slideably mounted in slots 568 of a pair of stationary guide members 569 and are pivoted at 570 to the related racks enabling a reciprocating motion of the slide links simultaneous with the racks.

To give an example of how a rack set is stopped at the proper position, assume that the left-hand rack set in Fig. 37 represents the tenths order and that the coded punching for the tenths order registration position is a 4 as shown in Fig. 36. It will be noted that the four racks in each set are labeled A, B, C and D to correspond to the four rows of the code pattern and that the notches cut in each rack represent the digit positions of the four rows of the code pattern (Fig. 36) which always remain unpunched.

The sensing of the 4 in the tenths position will cause the pawls in alignment with the B and C racks of the tenths rack set to be tripped and pivoted upward. The rack set then, upon being pivoted clockwise will engage the surfaces 571 of the A and D racks with the untripped pawls in alignment therewith. The rack set is then moved to the left and, since the four racks in each set are riveted together, the rack set will continue to move until the two untripped pawls simultaneously find notches in A and D racks. Consequently, the rack set will move the 0, 1, 2 and 3 notched positions past the pawls but since notches in the 4 position are present in both the A and D racks, the rack set will pivot into complete engagement with the pawls and be stopped. The related sector gear, which is also stopped at this time, will have reversed the tenths elapsed time type wheel a total of 4 teeth.

After the elapsed time has been printed, in a manner to be described, the complementary cams 518, 519 initiate the movement of the sector gears and racks toward the right and back to their original position, thus returning the elapsed time type wheels to their correct setting for future operation. The tripped stop pawls 482 will be restored and the racks disengaged from the untripped pawls as was described in connection with the sensing mechanism. The projecting surfaces 551 on the sector gears will restore the plates 549 and drive arms 548 which in turn restore the racks.

In the process of backing up the elapsed time type wheels during the computing cycle it may become necessary when one of the type wheels turns from 0 to 9 to borrow one digit or in effect subtract one extra digit from the next higher order type wheel. For example, suppose that for an "Out" registration of 8:25 the coded punchings for the previous "In" registration read 8:19. The total elapsed time then should be 0:06 minutes. However, upon backing up the type wheels in the usual manner wherein, for this case, the units type wheel backs up eight teeth, the tenths type wheel backs up one tooth, and the hundredths type wheel backs up nine teeth, the elapsed type wheels will be positioned at 0:16 which is incorrect. Since the hundredths type wheel passed from 0 to 9 in the course of being reversed, it becomes necessary to borrow an extra digit from the tenths type wheel in order that it may be positioned correctly at 0.

Similar borrow mechanisms are provided for the tens, units and tenths sector gears, the hundredths sector gear not requiring any. Referring to the tenths sector gear assembly shown in Fig. 27, it will be noted that the cam follower arm 556 straddles a cam 574 fastened to the hundredths pinion 547. When the hundredths pinion passes from 0 to 9 during the backing up of the hundredths type wheel, the high point on cam 574 will move the cam follower arm 556 up toward the right. This movement, through the slot in the follower arm and the stud 555 on the borrow pawl 553, will cause said pawl to pivot counterclockwise and as a result the drive pawl 550 will make an additional movement clockwise and the tenths sector gear will advance one more tooth. Thus, the tenths type wheel will be backed up one more tooth and will be correctly positioned at 0 for the example cited above.

The borrow for the units sector gear 536 (Fig. 28) is made in the same manner except that the borrow arm 561 which operates the borrow pawl 553 is fastened to a vertical bail member 575 which extends downward and is operated by a cam 576 fastened to a tenths pinion 443*a* (Fig. 25) secured to gear 443.

The borrow for the tens sector gear is also made in the same manner except that the borrow lever 562 which operates the borrow pawl 553 is fastened to a bell crank arm 577 pivoted on the type wheel shaft 431 and operated by a cam 578 fastened to the units pinion 446.

In order to suppress a computing cycle on an "In" registration and on an "Out" registration for which there is no associated "In" registration, the racks 499 are prevented from operating in their normal manner. The vertical position of the card and the position of the positioning holes in the card are the determining factors in either operation or suppression of the computing cycle. On an "In" rgistration and an "Out" registration without an associated "In" registration, a control sensing wire 579 (Fig. 21) contacts the card and is prevented from operating. When an "Out" registration follows an associated "In" registration, the positioning hole in the card will be so located as to permit the control sensing wire 579 to operate through the card.

The sensing wire 579 is attached to a lower arm portion 580 of a subtraction control bail pivoted on a fixed stud 581. The lower arm 580 bends upward at 582 and bends again into an upper arm portion 583. A spring 584, extending between a stud on arm 580 and a stud on the end plate 488, normally urges the bail assembly counterclockwise and the sensing wire upward; however, this movement is normally limited by a stud 585 fastened on slide plate 485 so that the sensing wire will normally be retained out of the path of the card.

A pair of links 586, pivoted to the arms 580, 583, support the projecting ends 587 of a bail. The bail reciprocates in a pair of slots 588 in the end plates 488 and has a cross member portion 589 which normally extends into the path of the right-hand rack sets and into notches 590 in the left-hand rack sets. When slide plates 485 and stud 585 move upward at the start of the computing cycle the sensing wire 579 will be moved into engagement with the card and, if no perforation is present in the card, the movement of the wire and arms 580, 583 will be insufficient to allow the cross member 589 of the bail from clearing the racks and the racks will be prevented from operating. If, on the other hand, sensing wire 579 encounters a perforation in the card the additional movement of the wire through the perforation will be sufficient to allow the bail cross member 589 to clear the racks.

*Printing*

The printing of conventional time and elapsed time is effected by an impact blow of a rubber platen against the type wheels. One platen is associated with the conventional time and another platen is associated with the elapsed time. The platen associated with the elapsed time print wheels can be controlled so that on an "In" registration, the printing of the setting of the elapsed time wheels can be suppressed.

Referring to Fig. 32, the two platens 590 and 591 are associated with the elapsed time and conventional time wheels respectively. These platens are secured to hammer slides 592, 593 and are spring operated by springs 594 and 595 fastened to fixed brackets 596, 597. The operation of the hammer slides is initiated from a cam 598 (Fig. 33) fastened to the computing shaft 106 and which coacts with roller followers 599 and 600 pivoted on a follower arm 601 which in turn is pivoted on a fixed stud 602.

Pivoted to the follower arm 601 is one end of a link 603, the other end of said link being pivoted to an arm 604 (Fig. 32) which is fastened on a shaft 605. Also secured to the shaft 605 are two cams 606 which coact with the two hammer slides.

Printing occurs near the end of the cycle of the computing shaft 106 and during the first portion of the cycle the hammer slides 592, 593 are cocked against the tension of springs 594 and 595 by the cams 606. Cam 598 rotates clockwise and during the first portion of the computing cycle the follower arm 601 and link 603 will move clockwise thereby imparting a counterclockwise rotation to the shaft 605 through arm 604. During this movement the cams 606 will coact against the notches 607 on the hammer slides and will cock the hammer slides against the tension of springs 594, 595 until the slides are latched in the cocked position by the corners 608 of a pair of latch levers 609. The latch levers 609 are pivoted on studs 610 fastened to the bracket members 596, 597 and are normally biased clockwise against the hammer slides by springs 611. When printing time is reached, surfaces **606*a* on the cams will strike lips 609*a* on the latch levers camming the latch levers 609 counterclockwise to release the hammer slides. The springs 594, 595** now force the hammer slides and platens against their associated type wheels to effect printing.

After the completion of printing, cam 598 will cam the follower arm 601 and link 603 counterclockwise to restore the cams 606 and latch levers 609.

The mechanism provided for preventing the printing of the setting of the elapsed time wheels on an "In" registration comprises a print suppression bail (Fig. 21) having a lower arm portion 612 which bends upward, similar to the bend 582 in the subtraction control bail, and then bends again to form an upper arm 613. The print suppression bail is also pivoted at 581 and is tied to the subtraction control bail by a spring 614. The print suppression bail is pivoted back and forth with the subtraction control bail depending upon whether the sensing wire 579 encounters a positioning hole in the card or not and as a result the end of the upper arm 613 is positioned either in or out of the path of a downwardly extending ear 615 of a control arm 616. The control arm 616 is pivoted on the shaft 525 and has an upwardly extending ear 617 which coacts with an adjusting screw 618 (Fig. 5) mounted in the arm 530 which is fixed on shaft 525.

The opposite end of control arm 616 has a slot 619 (Figs. 21 and 32) through which extends one leg of a U-shaped rod 620. The rod 620 is pivoted in a stationary bracket 621 and is biased by a spring 622, fastened to a fixed post 623, to normally force the control arm counterclockwise so that the ear 617 thereon bears against the adjusting screw 618 on arm 530.

The other leg of the U-shaped rod extends through a slot 624 in an interposer 625 slideable in frame member 626. A spring 627 fastened between a stud 628 on the interposer and the rod 620 serves to tie the interposer to said rod. If the sensing wire 579 fails to encounter a positioning hole in the card, arm 613 will remain in the path of the ear 615 on the control arm thus preventing the control arm from following the movement of arm 548. Under this condition the print suppression mechanism will be in the position shown in Figs. 21 and 32, wherein the interposer 625 extends through a notch in the hammer slide 592 to prevent the operation of same and thus prevent printing of the elapsed time. When the sensing wire 579 encounters a hole, arm 613 will move out of the path of the control arm and the control arm through springs 622, 627 and rod 620 will move the interposer 625 clear of the hammer slide 592 to allow printing of the elapsed time. The print suppression mechanism will be restored when the arm 530 (Fig. 5) is rotated clockwise.

*Ribbon feeding mechanism*

As shown in Figs. 2, 3 and 4, the ribbon feeding mechanism is located about half way up on the left-hand side of the recorder and comprises two serrated spools 629 and 630 around which an inked ribbon 631 is wound. The ribbon mechanism is mounted on a support plate 632 which is fastened to a front shield 633 (Figs. 4 and 13) having a hand gripper plate 634 secured thereto. Loosely fastened to the front shield 633 is a back shield plate 635 (Fig. 13) and the ribobn travels from one spool across and in between the shields 633, 634, overlapping over the beveled end of the front shield 633, and back in between the shields again to the other spool (see also Fig. 33). The shield and support plate assembly is slideably mounted to casting member 636 so that the unit may be easily removed from the recorder when necessary. When inserted in the recorder, the shield assembly extends between the print platens and the type wheels with the front shield having openings 637, 638 (Fig. 13) and the back shield having an opening 639 for exposing the ribbon to the platens and to the elapsed time type wheels 430 and conventional type wheels **261, 266*a***.

The ribbon feed is actuated from the computing shaft, which makes one revolution after every card insertion, and feeding actually occurs during the beginning of the computing cycle simultaneous with the cocking of the print platens.

Referring to Fig. 33, a link 640 is pivotally connected between the follower arm 601 and a ribbon detent plate 641 and imparts a back and forth rotary motion to said detent plate which pivots on a fixed rod 642 on the support plate 632. A ribbon feed plate 643 is mounted slideably on the rod 642 and has a formed lip **643*a* which coacts with a cam surface 641*a* on the detent plate. A pair of springs 644 and 645 serve to maintain the two plates in contact with each other at the cam surface 641*a***.

Feed pawl extensions **643*b* and 643*c* on the feed plate coact with the serrated spools, the upwardly extending pawl 643*b* working on the upper spool 629 (Fig. 2) and the downwardly extending pawl 643*c* working on the lower spool 630 (Fig. 33). As shown in Figs. 2, 3 and 4, the spools are both pivoted on the rod 642, one on each side of the support plate 632, and are retained thereon by a pair of leaf spring members 646. When the lip 643*a* on the feed plate is positioned to the left of the high point on cam surface 641*a*, as shown in Fig. 33, the feed pawl extension 643*c* is in engagement with the lower spool 630 and, upon movement of link 640 toward the left, the detent plate 641 and feed plate 643 will pivot counterclockwise to advance the spool 630 and the ribbon. During the counterclockwise movement of the detent plate the springs 644, 645**, will insure that the feed plate follows.

A positive return lock is provided to prevent the lower spool from rotating clockwise when the feed plate 643 is restored. This is effected by a stop link 647 which is pivoted on a stud 648 fixed on the support plate. Also pivoted on the stud 648 is another stop link 649 which is biased by a spring 650 to bear against the pawl **643*b* on the feed plate. The stop link 647 has a downwardly extending ear 651, which under the influence of a spring 652 fastened between the two stop links, is urged into engagement with the lower spool to prevent any reverse movement of the spool while it is actively feeding the ribbon. An upwardly extending ear 653 on the stop link 649 performs in the same manner on the upper spool when it is actively feeding the ribbon. The leg 654 on the stop link 649 coacts with the end of the stop link 647 to prevent it from engaging the lower spool when stop link 649** is operating on the upper spool.

In order to feed the upper spool 629 thus reversing the ribbon, the feed plate 643 must be shifted on the detent plate 641 so that the lip **643*a* is on the other side of the high spot on cam surface 641*a*. This displacement allows the pawl 643*b* to engage the upper spool 629 while the other pawl 643*c* is disengaged from the lower spool 630. The feeding of the upper spool is similar to that just described for the lower spool and the shift upward of the pawl 643*b*** causes the stop links to reverse their operation to prevent any reverse movement of the upper spool.

The reversing of the ribbon is initiated by a pair of reversing bails 655 and 656. The bails are pivoted on stationary studs 657 and are biased by a spring 658 so that a leg on each bail bears against the pivot stud of the other bail. The ribbon rides in a slot in an upwardly extending arm 659 on bail 656 and also in a similar slot in a downwardly extending arm 660 on the bail 655, and rivets fastened at each end of the ribobn will actuate either bail 655 or 656 when a reversal is required.

When the end of the ribbon is reached during the feed of the lower spool, the rivet on the ribbon will cause bail 656 to pivot clockwise. As a result, a lip 661 on the bail will engage a notch **643*d* on the feed plate on the succeeding counterclockwise movement of the plate. The feed plate, now prevented from returning to its normal position, will slide on rod 642 with the lip 643*a* transferring to the other side of the high point on cam surface 641*a*. This shift engages the pawl 643*b* to feed the upper spool 629. The bail 655 operates in similar fashion to transfer the feedback to the lower spool 430**.

*Interlocks*

Interlocks are provided in the recorder so that no computing cycle may take place while a minute advance cycle is in progress and no minute advance cycle can be initiated if a computing cycle is in progress. The latter condition is not a direct interlock but is such in effect by virtue of the interlock which is set up when cross-feeding of a card is started.

When the computing clutch (Fig. 8) is engaged, an interlocking stud 662, secured on the computing clutch dog 195, will enter a recess in minute shaft interlock disc 241. If the minute shaft 78 is revolving, disc 241 will coact with the stud 662 and prevent the computing clutch dog from fully engaging the computing shaft ratchet 199.

If a cross-feed cycle has been started, the ratchet stop lever 143 (Fig. 8) is pivoted clockwise and will coact with interlock bell crank 235 to prevent the minute clutch dog 237 from engaging the minute clutch ratchet 239. Since a computing cycle is initiated from a cross-feed cycle an interlock is provided which will prevent a minute shaft cycle while either the computing shaft or the cross-feed shaft is in operation.

Also, a card interlock is provided to prevent the insertion of another card while one is still in the machine, Referring to Fig. 3, a throat block lever 663 is fasteend at the top of the rock shaft 136 and this lever will be positioned across both card throats immediately after a card coacts with the vertical card stop lever 124 (Fig. 13) and the rock shaft is tripped. The throat block lever is retracted when the rock shaft is relatched.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An elapsed time recording machine comprising record feeding means, elapsed time instrumentalities, means for advancing said elapsed time instrumentalities, a drive motor connected to said feeding means, a motor circuit therefor, a switch in said motor circuit movable between an open circuit position and a closed circuit position, means operable upon insertion of a record for closing said switch to energize said motor and start a feed cycle, means for intercepting a record fed by said feeding means, second record feeding means, means controlled by said intercepting means upon intercepting a record for connecting said second feeding means with said drive motor to continue feeding said record, recording means for recording the setting of the elapsed time instrumentalities on said record, means controlled by said second feeding means for opening said switch to de-energize said motor after recording, cyclically operable means for closing said switch to energize said motor to initiate a timekeeping cycle, means controlled by said cyclically operable means for connecting said motor with said advancing means, and means controlled by said advancing means for opening said switch to de-energize said motor at the end of the timekeeping cycle.

2. An elapsed time recording machine for recording on a record containing positioning perforations, comprising time recording means, elapsed time instrumentalities for setting said time recording means, record feeding means for positively feeding a record through the machine and past said time recording means, record receiving means for guiding a record inserted therein to said record feeding means, means operated by an inserted record to start said record feeding means, sensing means for sensing the positioning perforations on said record, means under control of said sensing means for interrupting said record feeding means to stop the record at a predetermined position at said recording means in accordance with the positioning perforations sensed, and means set in operation upon interruption of said record feeding means for recording upon the record the setting of said time recording means.

3. An elapsed time computer for acting on a record comprising record feeding means, elapsed time instrumentalities, driving means for said feeding means, means for advancing said elapsed time instrumentalities, a record stop, means operable upon insertion of a record for connecting said driving means and feeding means to feed a record to said record stop, cross-feeding means, means controlled by the record stop upon receipt of a record for establishing driving connections between said cross-feeding means and said driving means to again feed the record, means for sensing the record during the latter movement of same, means under control of said sensing means for disengaging said cross-feeding means from said driving means to stop the record, recording means operable under control of said disengaging means for recording the setting of the elapsed time instrumentalities on said record, and means operable after operation of said recording means for again establishing driving connections between said cross-feeding means and said driving means to continue the feed of the record.

4. An elapsed time computer for acting on a record having several recording areas comprising a record receiver having an "In" registration slot and an "Out" registration slot, a first record stop associated with said "In" slot, a second record stop associated with said "Out" slot and displaced from said first stop, feeding means operable upon insertion of a record in either of said slots for feeding a record to its related card stop, a recording station, recording means at said recording station, second feeding means, and means concontrolled by either of said card stops upon receipt of a record for effecting operation of said second feeding means to feed said record to said recording station, said recording areas on the record being presented to the recording means depending upon whether the record is stopped by the first or second record stop upon insertion.

5. In an elapsed time computer for acting upon a record having control perforations, a receiver having an "In" registration slot and an "Out" registration slot, a recording station, timekeeping type wheels and elapsed time type wheels at said recording station, printing devices for cooperation with said timekeeping type wheels, printing devices for cooperation with said elapsed time type wheels, feeding means operable upon the insertion of a record into either of said slots for feeding the record to said recording station, means for sensing the record, means for initiating operation of said printing devices, and means controlled by said sensing means for suppressing operation of the elapsed time printing devices on an "In" registration.

6. In an elapsed time computer for acting upon a record having time perforations and control perforations, a receiver having an "In" registration slot and an "Out" registration slot, timekeeping recording devices and elapsed time recording devices, feeding means operable upon insertion of a record into either of said slots for feeding the record to the recording devices for cooperation therewith, sensing means for sensing the time perforations on the record, computing devices operable to adjust said elapsed time recording devices to record elapsed time with respect to the time perforations sensed, second sensing means for sensing the control perforations on the record, and means controlled by said second sensing means for preventing operation of said computing means on an "In" registration.

7. In an elapsed time computer for acting upon a record having an area for the receipt of "In" registration data and an area for the receipt of "Out" registration data, said areas having line positioning holes punched for each line of recorded data thereon, a receiver having an "In" registration slot and an "Out" registration slot, a plurality of conventional time type wheels and elapsed time type wheels, means for periodically advancing said type wheels, punching devices settable according to the setting of said elapsed time type wheels, printing devices for cooperation with said conventional time type wheels, printing devices for cooperation with said elapsed time type wheels, a punching device for punching a positioning hole in the record, feeding means operable upon the insertion of a record into the "In" slot for feeding the record to present the "In" registration area thereon to the conventional time type wheels and the punching devices, means for sensing said record during feeding, means controlled by said sensing means for stopping the record at the next recording line as determined by the positioning holes in said record, means controlled by the stopping of the record for initiating operation of said printing and punching devices, and means for suppressing operation of the elapsed time printing devices on an "In" registration.

8. An elapsed time computer according to claim 7 having a second sensing means for sensing elapsed time punchings in the "In" registration area of a record, feeding means operable upon the insertion of a record into the "Out" slot for feeding said record to present the "In" registration area thereon to said second sensing means and the "Out" registration area thereon to the elapsed time type wheels and the punching devices, said first sensing means serving to stop the feeding of the record at the correct recording line, computing instrumentalities, means controlled by the stopping of the record for initiating operation of said computing instrumentalities, means operated by said computing instrumentalities and under control of said second sensing means for reversing said elapsed time type wheels to indicate elapsed time, means controlled by said computing instrumentalities for initiating operation of said printing and punching devices, and means for disabling said elapsed time print suppression means for an "Out" registration.

9. In an elapsed time computer for acting on a record having a plurality of line positioning holes arranged vertically opposite lines of registration data, a record receiver, a record stop associated with said receiver, feeding means operable upon insertion of a record into said receiver for feeding said record to said record stop, a sensing element, second feeding means, means operable by said record stop upon receipt of a record for effecting operation of said second feeding means, said second feeding means feeding said record to present the registration positioning holes sequentially last hole first to said sensing element, a recording station, and means operable under control of said sensing element upon sensing the last registration positioning hole for disabling said second feeding means to stop said record with the next blank recording line at the recording station.

10. In an elapsed time computer for acting on a record having a plurality of line positioning holes arranged vertically opposite lines of "In" registration data and a plurality of line positioning holes arranged vertically opposite lines of "Out" registration data, each line of "In" registration data being in horizontal alignment with a line of "Out" registration data, a record receiver having an "In" registration slot, a record stop associated with said receiver, feeding means operable upon insertion of a record into said "In" slot for feeding said record to said record stop, a first sensing element, a second sensing element, second feeding means, means operable by said record stop upon receipt of a record for effecting operation of said second feeding means, said second feeding means feeding said record to present the "In" registration positioning holes sequentially last hole first to said first sensing element and said "Out" registration positioning holes sequentially last hole first to said second sensing element, said second sensing element operating for a condition where an "In" registration is omitted and two successive "Out" registrations have been made on the record to sense the last "Out" registration positioning hole, and means operable under control of said second sensing element for disabling said second feeding means to stop the record with the next completely blank line at the recording station.

11. An elapsed time computer according to claim 10 comprising an "Out" registration slot in said receiver, a second record stop, said first-named feeding means operable upon insertion of a record into said "Out" slot for feeding said record to said second record stop, means operable by said second record stop upon receipt of a record for effecting operation of said second feeding means, a third sensing element, said second feeding means feeding said record to present the "In" registration positioning holes sequentially last hole first to said third sensing element and said "Out" registration positioning holes sequentially last hole first to said first sensing element, said third sensing element operating for a condition where an "Out" registration is omitted and two successive "In" registrations have been made on the record to sense the last "In" registration positioning hole, and means operable under control of said third sensing element for disabling said second feeding means to stop the record with the same line on which the last "In" registration was made positioned at the recording station.

12. A device of the class described having a program tape containing a plurality of channels for receiving control perforations, a plurality of sensing elements corresponding to the channels on said tape, means for rocking said sensing elements into engagement with said tape causing any sensing element encountering a perforation to protrude through said tape, a pair of bail members disposed on the opposite side of said tape from said sensing elements, each of said bail members adapted for cooperation with different ones of said sensing elements, a rockable carrier frame, said bail members being pivoted on said carrier frame, means for rocking said frame to move said bail members into engagement with any sensing element protruding through said tape, said bail members pivoting in opposite directions upon engaging a sensing element, and a control member actuated by said bail members into either of two positions depending upon which bail member encountered a sensing element.

13. A device according to claim 12 having elapsed time instrumentalities, advancing means connected to said elapsed time instrumentalities, cyclically operable driving means for operating said advancing means, and clutching means operated by said control member for engaging or disengaging said advancing means with said drivings means.

14. A device of the class described having timekeepting instrumentalities, means for advancing said timekeeping instrumentalities, a program tape having a plurality of program channels for receiving control perforations, sensing elements for sensing said program channels, program control means, means for advancing said program control means in synchronism with said timekeeping instrumentalities, means for operating said sensing elements to sense the program channels, and means under control of said program control means for selecting the sensing elements which are to be operated.

15. A device of the class described having a program tape with a plurality of program channels for receiving control perforations, sensing elements representing said program channels, means for rocking said sensing elements into and out of engagement with said tape, timekeeping instrumentalities, program control means, means for advancing said timekeeping instrumentalities and said program control means in synchronism, a perforated control element movable between said sensing elements and said tape, and means operable under control of said program control means for positioning said control element to allow certain of said sensing elements to be rocked through perforations in said control element for engagement with said tape.

16. A device according to claim 15 wherein said program control means comprises means for automatically controlling AM–PM programming and means for selectively controlling regular day or special day programming.

17. A device according to claim 14 wherein the perforations in said control element are normally in alignment with certain ones of said program channels, said perforations being arranged in two groups, one group being normally in alignment with the corresponding sensing elements and the other group being normally out of alignment with its corresponding sensing elements, said program control means and control element positioning means operating to selectively shift said control element to control which sensing elements will be allowed to sense their corresponding program channels in the tape.

18. A device of the class described comprising record feeding means, driving means for said feeding means, record receiving means, means operable upon insertion of a record into said record receiving means for connecting said driving means and feeding means to feed a record through said device, control means for determining whether a record has been correctly or incorrectly inserted in said record receiving means, means conditioned by said control means upon correct insertion of a record for interrupting operation of said feeding means, recording means, means for operating said recording means during the interruption of said feeding means, and means conditioned by said control means upon incorrect insertion of a record for preventing operation of said interrupting means and said recording means.

19. An elapsed time recorder comprising elapsed time type wheels, advancing means for periodically advancing said type wheels in a forward direction, releasable means for connecting said advancing means with said type wheels, driving means for driving said type wheels in a reverse direction, yieldable means driven by said driving means and connecting said driving means with said type wheels, control means connected to said yieldable means, a sensing device for sensing perforations in a record, and means controlled by said sensing means for engaging said control means during reverse movement thereof to stop the reverse movement of said type wheels.

20. An elapsed time recorder comprising elapsed time type wheels, advancing means for periodically advancing said type wheels in a forward direction, releasable means for connecting said advancing means with said type wheels, driving means for driving said type wheels in a reverse direction, yieldable drive elements driven by said driving means and connecting said driving means with said type wheels, racks connected to said yieldable drive elements, a sensing device for sensing perforations in a record, pawls conditioned by said sensing device into tripped and untripped positions, and means for engaging the racks with said untripped pawls during reverse movement of the racks for stopping the reverse movement of said yieldable drive elements and said type wheels.

21. A time computer having timekeeping instrumentalities comprising a units of days ratchet wheel having ten teeth representing 0 through 9, a tens of days ratchet wheel having ten teeth for representing in two sequences 1, 2, 3, 3 and blank, actuating means for advancing said ratchet wheels, means for operating said actuating means with a short stroke or a long stroke once a day, a month wheel advanced by said tens wheel, means controlled by said month wheel to cause said operating means to make a long stroke during 30 day months and a short stroke during 31 day months, said actuating means normally advancing said units wheel once a day and being controlled by said units wheel to engage said tens wheel to advance same during every tenth advance of said units wheel, said actuating means normally advancing with a short stroke on the 31st day of a month to advance the units wheel from 0 to 1, and one of the teeth representing 3 on said tens wheel adapted to receive the short stroke on the 31st day to advance said tens wheel to a second 3 representing position.

22. A time computer according to claim 21 wherein either of the blank teeth on said tens wheel is adapted to receive the short stroke of said actuating means at the end of a 31 day month to advance said tens wheel to a blank position and means for preventing the engagement of said actuating means with said units wheel during the latter movement of said tens wheel from 3 to the blank position.

23. A time computer having timekeeping instrumentalities comprising a units of days ratchet wheel having ten teeth representing 0 through 9, a tens of days ratchet wheel having ten teeth for representing in two sequences 1, 2, 3, 3 and blank, actuating means for advancing said ratchet wheels, means for operating said actuating means with a short stroke or a long stroke once a day, a month wheel advanced by said tens wheel, means controlled by said month wheel to cause said operating means to make a long stroke during 30 day months and a short stroke during 31 day months, said wheels being advanceable one position on a short stroke and two positions on a long stroke, means effective during a long stroke for maintaining said actuating means clear of all teeth on said wheels except the blank teeth on said tens wheel for a portion of the stroke so that the advancements made on all teeth except said blank teeth will be one position advancements, said actuating means normally advancing said units wheel one position a day during 30 day months and controlled by said units wheel to engage and advance said tens wheel one position during every tenth advance of said units wheel, either of said blank teeth being adapted to receive the long stroke at the end of a 30 day month to advance said tens wheel two positions to a blank position, means for preventing the engagement of said actuating means with said units wheel during said two position advancement of the tens wheel, and means on said tens wheel for advancing said units wheel one position from 0 to 1 during the two position advancement of said tens wheel.

References Cited in the file of this patent

UNITED STATES PATENTS

| | | |
|---|---|---|
| 313,934 | Griswold | Mar. 17, 1885 |
| 663,466 | Puttkammer et al. | Dec. 11, 1900 |
| 706,155 | Browning | Aug. 5, 1902 |
| 834,487 | Peterson | Oct. 30, 1906 |
| 1,187,495 | Bryce | June 20, 1916 |
| 1,267,510 | Bryce | May 28, 1918 |
| 2,027,033 | Ford | Jan. 7, 1936 |
| 2,294,739 | Connolly | Sept. 1, 1942 |
| 2,330,387 | Ruttiman et al. | Sept. 28, 1943 |
| 2,421,697 | Hobby | June 3, 1947 |
| 2,510,552 | Carroll et al. | June 6, 1950 |
| 2,553,644 | Fehr | May 22, 1951 |
| 2,563,513 | Braun | Aug. 7, 1951 |
| 2,591,448 | Lorenz | Apr. 1, 1952 |
| 2,645,551 | Sprecker | July 14, 1953 |
| 2,672,287 | Reitfort | Mar. 16, 1954 |